United States Patent
Huemer et al.

(10) Patent No.: US 12,097,491 B2
(45) Date of Patent: *Sep. 24, 2024

(54) AUTOMATIC ANALYZER AND OPTICAL MEASUREMENT METHOD FOR OBTAINING MEASUREMENT SIGNALS FROM LIQUID MEDIA

(71) Applicant: Meon Medical Solutions GmbH & Co KG, Graz (AT)

(72) Inventors: Herfried Huemer, Feldbach (AT); Arnold Bartel, Graz (AT); Patrick Kraus-Füreder, Graz (AT); Robert Scholz-Mareich, Graz (AT); Wolfgang Sprengers, Vasoldsberg (AT); Michael Bergbaur, St. Marein Bei Graz (AT); Reinhard Marik, Graz (AT)

(73) Assignee: Meon Medical Solutions GmbH & Co KG, Graz (AT)

( * ) Notice: Subject to any disclaimer, the term of this patent is extended or adjusted under 35 U.S.C. 154(b) by 788 days.

This patent is subject to a terminal disclaimer.

(21) Appl. No.: 17/049,849

(22) PCT Filed: Apr. 12, 2019

(86) PCT No.: PCT/AT2019/060124
§ 371 (c)(1),
(2) Date: Oct. 22, 2020

(87) PCT Pub. No.: WO2019/204841
PCT Pub. Date: Oct. 31, 2019

(65) Prior Publication Data
US 2021/0197188 A1    Jul. 1, 2021

(30) Foreign Application Priority Data

Apr. 23, 2018 (AT) ............................... A 50341/2018
Jul. 13, 2018 (AT) ............................... A 50605/2018
Jan. 11, 2019 (AT) ............................... A 50021/2019

(51) Int. Cl.
*B01L 3/02* (2006.01)
*G01N 21/59* (2006.01)
(Continued)

(52) U.S. Cl.
CPC ............ *B01L 3/0289* (2013.01); *G01N 21/59* (2013.01); *G01N 35/026* (2013.01);
(Continued)

(58) Field of Classification Search
CPC ... B01L 3/0289; B01L 2200/14; G01N 21/59; G01N 35/026; G01N 35/1002;
(Continued)

(56) References Cited

U.S. PATENT DOCUMENTS 4,299,796 A * 11/1981 Hogen Esch .......... G01N 35/00
422/65
4,931,402 A    6/1990 Abplanalp
(Continued)

FOREIGN PATENT DOCUMENTS

DE    2726498 A1    12/1978
EP    1230553 B1    8/2008
(Continued)

*Primary Examiner* — Jill A Warden
*Assistant Examiner* — John McGuirk
(74) *Attorney, Agent, or Firm* — Dykema Gossett PLLC

(57) ABSTRACT

Aspects of the present disclosure are directed to a method and a device for carrying out chemical, biochemical and/or immunochemical analyses of liquid samples, which are present in a sample store of an automatic analyzer, with the aid of liquid reagents, which are present in at least one reagent store of the analyzer. In one embodiment, a analyzer is disclosed including cuvettes for holding the liquid samples and reagents, the cuvettes are arranged in at least one stationary, linear cuvette array. The analyzer further has
(Continued)

an optical measurement unit with a stationary light-supplying unit which has at least one light distributor device that feeds the light from a plurality of LED light sources emitting in a spectrally different manner in the UV/VIS/NIR wavelength range into the inlet windows of the individual cuvettes of the cuvette array. The optical measurement unit further includes a stationary detection unit assigned to outlet windows of the cuvettes and further includes a plurality of photodiodes.

26 Claims, 20 Drawing Sheets

(51) Int. Cl.
*G01N 35/00* (2006.01)
*G01N 35/02* (2006.01)
*G01N 35/04* (2006.01)
*G01N 35/10* (2006.01)

(52) U.S. Cl.
CPC ....... *G01N 35/1002* (2013.01); *G01N 35/109* (2013.01); *B01L 2200/14* (2013.01); *G01N 2035/00356* (2013.01); *G01N 2035/0437* (2013.01); *G01N 2201/0631* (2013.01); *G01N 2201/0813* (2013.01)

(58) Field of Classification Search
CPC ....... G01N 35/109; G01N 2035/00356; G01N 2035/0437; G01N 2201/0631; G01N 2201/0813; G01N 21/253; G01N 35/1004
See application file for complete search history.

(56) References Cited

U.S. PATENT DOCUMENTS

| | | | |
|---|---|---|---|
| 5,178,833 A | 1/1993 | Covain | |
| 5,482,863 A | 1/1996 | Knobel | |
| 5,482,864 A * | 1/1996 | Knobel | ................ G01N 35/109 |
| | | | 436/526 |
| 5,897,837 A | 4/1999 | Mizuno | |
| 8,064,062 B2 | 11/2011 | Ogawa | |
| 8,675,187 B2 | 3/2014 | Harada et al. | |
| 8,696,990 B2 | 4/2014 | Meller et al. | |
| 8,911,685 B2 | 12/2014 | Watanabe et al. | |
| 8,936,754 B2 | 1/2015 | Yamazaki et al. | |
| 2008/0240898 A1 | 10/2008 | Manz et al. | |
| 2010/0047128 A1* | 2/2010 | Mototsu | .................. B08B 3/102 |
| | | | 422/63 |
| 2011/0007320 A1* | 1/2011 | Krauss | .................... G01N 21/59 |
| | | | 356/445 |
| 2013/0019697 A1* | 1/2013 | McKeen | .......... G01N 35/00029 |
| | | | 73/863.21 |
| 2013/0301051 A1 | 11/2013 | Pogosyan | |
| 2014/0287523 A1 | 9/2014 | Donohue | |
| 2017/0176478 A1* | 6/2017 | Harbers | ................ G01N 21/274 |
| 2018/0088025 A1* | 3/2018 | Haghgooie | ............ G01N 21/03 |

FOREIGN PATENT DOCUMENTS

| | | |
|---|---|---|
| EP | 1995597 A1 | 11/2008 |
| EP | 2322939 A1 | 5/2011 |
| EP | 2410342 A2 | 1/2012 |
| EP | 3182096 A1 | 6/2017 |
| GB | 1321754 A | 6/1973 |
| JP | 2007010345 A | 1/2007 |
| JP | 2007303964 A | 11/2007 |
| WO | 1999046601 A1 | 9/1999 |

\* cited by examiner

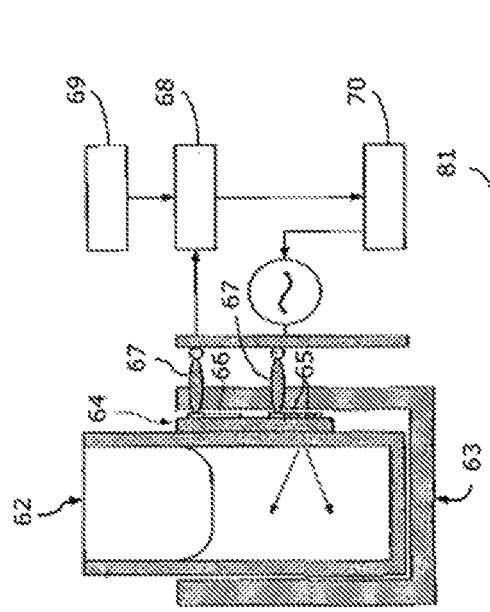
Fig. 2b (PRIOR ART)
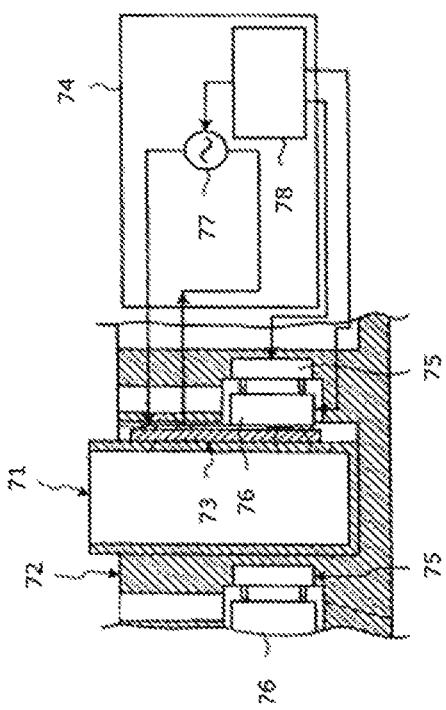
Fig. 2d (PRIOR ART)
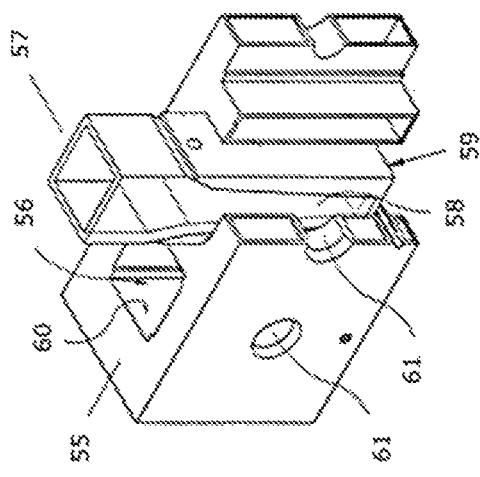
Fig. 2a (PRIOR ART)
Fig. 2c (PRIOR ART)

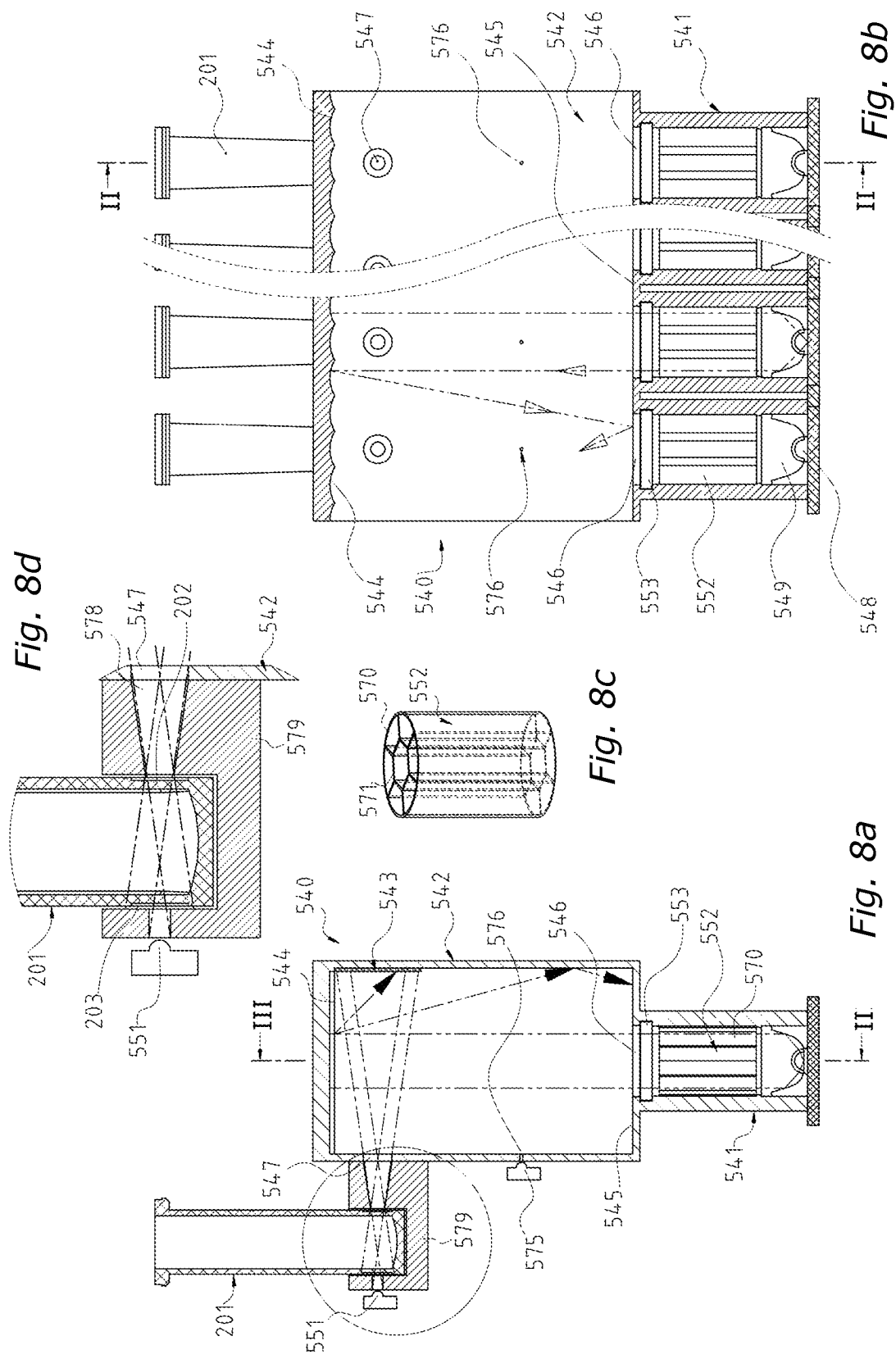

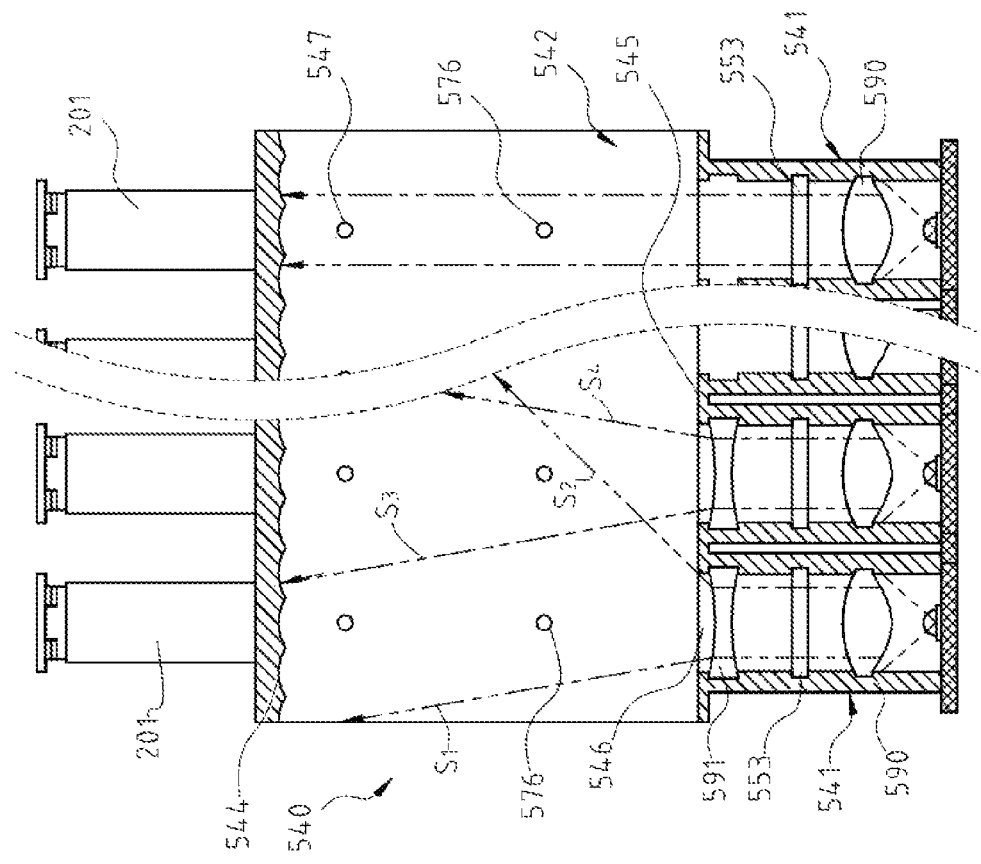
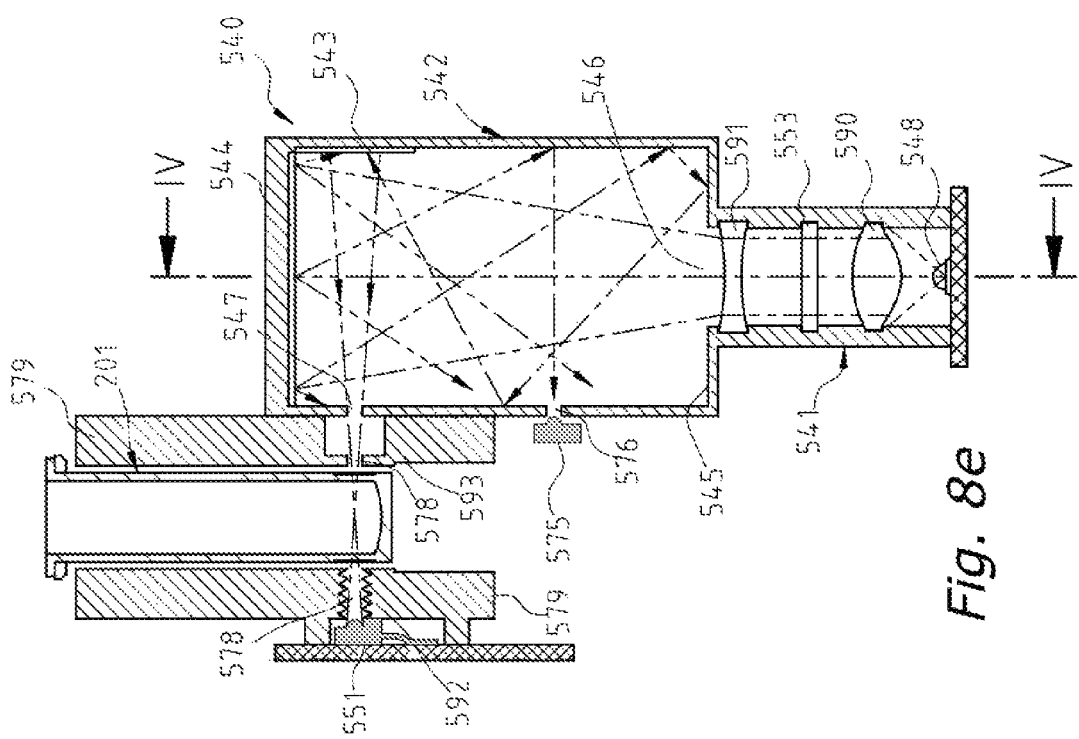
Fig. 8f
Fig. 8e

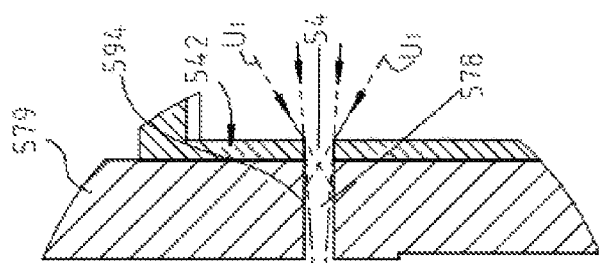
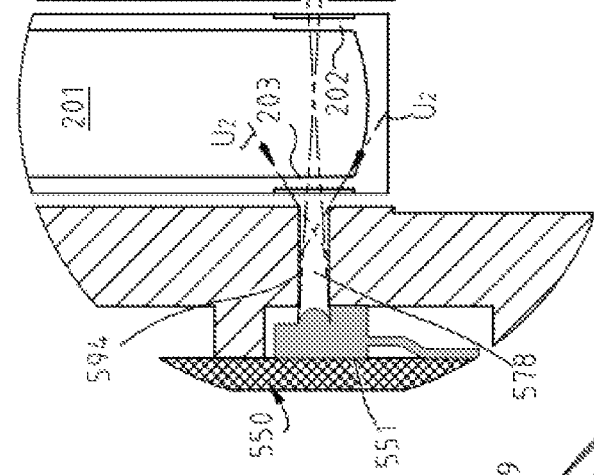
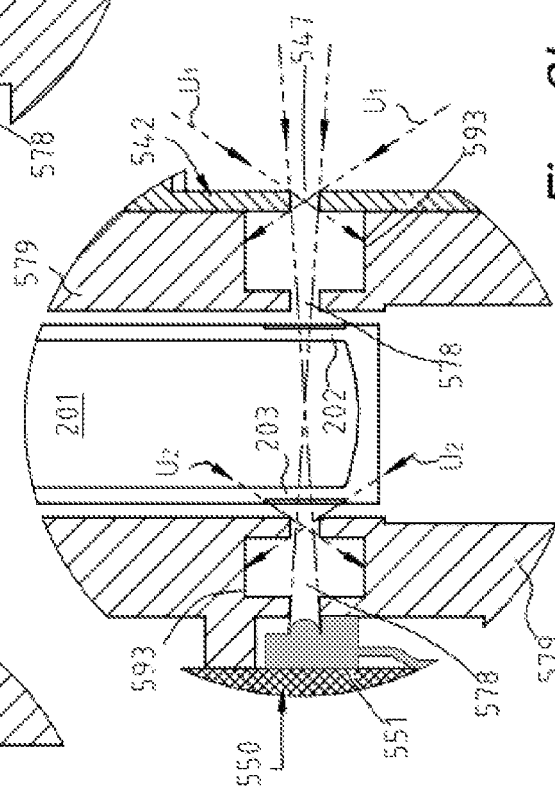
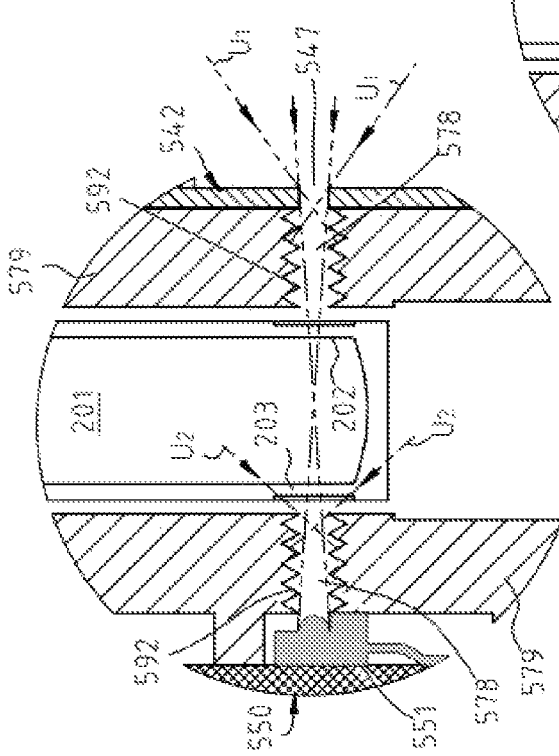

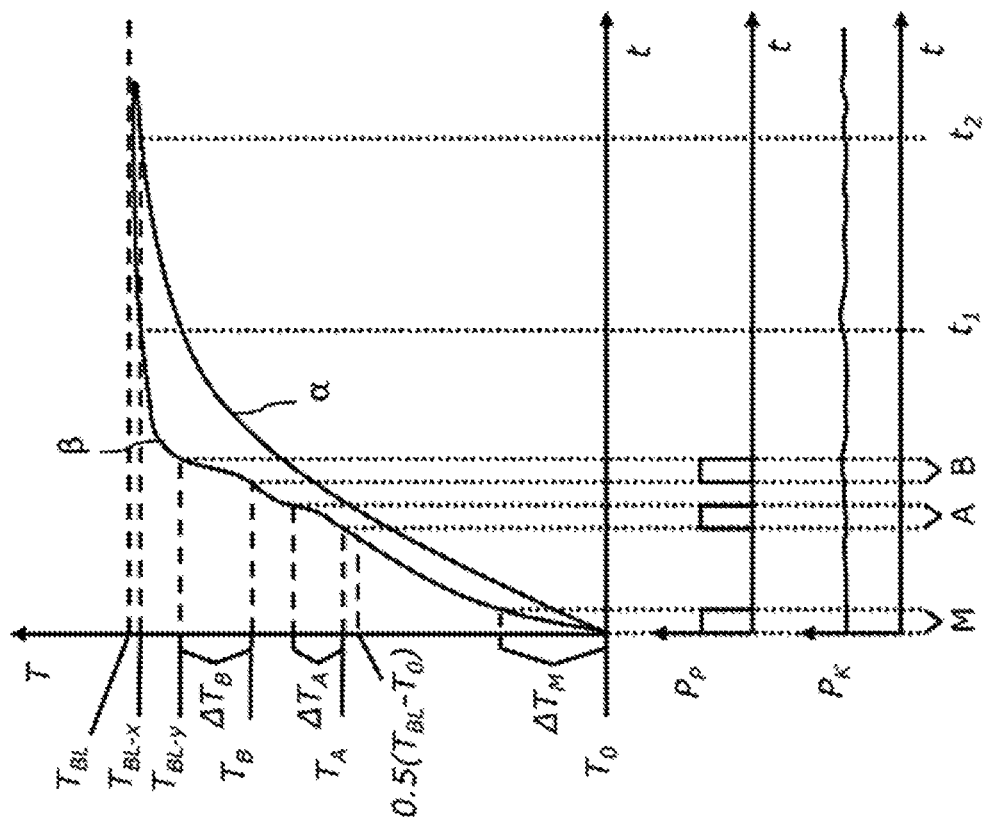
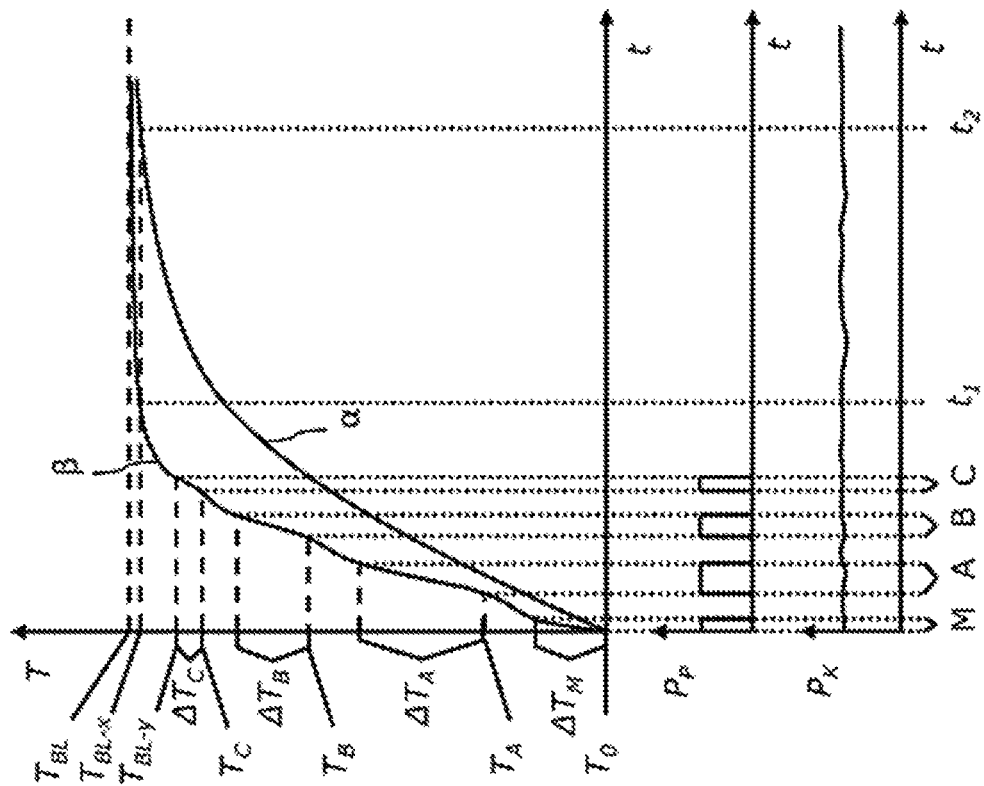

AUTOMATIC ANALYZER AND OPTICAL MEASUREMENT METHOD FOR OBTAINING MEASUREMENT SIGNALS FROM LIQUID MEDIA

CROSS-REFERENCE TO RELATED APPLICATIONS

This application is a national stage filing based upon International application No. PCT/AT2019/060124, filed 12 Apr. 2019, which claims the benefit of priority to Austria application Nos. A 50341/2018, filed 23 Apr. 2018; A 50605/2018, filed 13 Jul. 2018; and A 50021/2019, filed 11 Jan. 2019.

BACKGROUND

The invention relates to an automatic analyzer for carrying out chemical, biochemical and/or immunochemical analyses of liquid samples, which are present in a sample store of the analyzer, with the aid of liquid reagents, which are present in at least one reagent store of the analyzer, to a method for automatic chemical, biochemical and/or immunochemical analysis of liquid samples, and to an optical measurement method for obtaining measurement signals from liquid media.

Automated analyzers or analysis devices are routinely used, for example in clinical diagnostics, analytics and microbiology, where there is a need to determine various properties and ingredients of liquid samples quickly, accurately and reproducibly, in particular using optical methods.

Various measurement principles are used in the known analysis devices. On the one hand, use is made of devices having a stationary detection unit, for example a stationary photometer, and a disk-shaped, rotatable holder with cuvettes for holding the reaction mixtures to be measured, consisting of samples and reagents. The cuvettes are successively moved past the detection unit and measured. Consequently, the cuvette carousel has to stop whenever a new sample or a reagent is being introduced into a cuvette or the cuvette is to be washed and made available for a new test. The cycle times, which in this concept are rigidly predefined, are associated with a considerable loss of efficiency. Further details regarding this can be found in the discussion of the prior art (see point A).

In optical measurement units for obtaining measurement signals from liquid media, different types of measurement are used:

Photometry

The physical effect on which photometric measurement is based is the absorption of light of particular wavelengths by particular substances present in a liquid. The resulting reduction in the intensity of the light passing through the cuvette is detected using measurement technology, and permits a quantitative determination of the concentration of a substance by taking the following equations into account:

$$T = I/I_0 \quad (Eq\ 1)$$

$$E = -\log T = \log(I_0/I) \quad (Eq\ 2)$$

$$E = \varepsilon \cdot c \cdot d \quad (Eq\ 3)\ \text{Lambert-Beer's law}$$

where
T . . . transmission
E . . . extinction
$I_0$ . . . intensity in the absence of the light-absorbing substance
I . . . intensity in the presence of the light-absorbing substance
c [mol/l] . . . molar concentration
d [cm] . . . thickness of the absorbent liquid layer
$\varepsilon$ [l mol$^{-1}$ cm$^{-1}$] . . . molar extinction coefficient (substance-dependent variable)

The molar concentration c can thus be calculated directly from the result of an extinction or transmission measurement. This type of measurement is used in chemical and enzymatic reactions to determine the molar concentration of particular analytes present in the sample (blood plasma, urine, etc.). In this case, light-absorbing substances (dyes) appear or disappear, and the molar concentration of the analyte to be determined is then deduced from the extinction or changes in the extinction thereof.

Turbidimetry and Nephelometry

This type of measurement is used in homogeneous immunoassays, wherein particular analytes, such as for example enzymes, peptides or proteins, are reacted with antibodies. This results in larger structures, which cause increased light scattering or turbidity of the sample.

While in the case of transmission measurement the intensity of the light beam passing through decreases as the analyte concentration increases due to the increasing turbidity, at a detection angle of 90° the intensity of the scattered light beam increases as the turbidity increases.

The turbidity measurement in the form of the transmission measurement is referred to as turbidimetry. The associated measurement device is referred to as a turbidimeter. The scattered light measurement taking place at an angle of, for example, 90° to the light beam passing through is referred to as nephelometry, and the associated measurement device is referred to as a nephelometer.

For a better understanding of the invention, a few essential technical terms used in the present application will be defined in greater detail:

Analyzer:

Device for carrying out chemical, biochemical and/or immunochemical analyses of liquid samples, which are present in a sample store located in the device, with the aid of liquid reagents, which are present in at least one reagent store located in the device.

x-axis, y-axis and z-axis:

The x-axis means the horizontally extending longitudinal axis, the y-direction means the horizontally extending width or depth axis, and the z-means the vertically extending height axis of the analyzer (see for example FIG. 3).

Cuvette:

A cuvette in the sense of the present invention refers to a temperature-controllable vessel, which is closed on all sides and is open at the top, for holding sample liquids and reagent liquids and the resulting reaction mixtures and is used to measure the reaction mixtures by means of photometric and/or luminescence-optical methods. A cuvette in the sense of the present invention has at least one window which is arranged in a side wall of the cuvette and which is transparent for the optical measurement method used, or is optically transparent as a whole.

Stationary Cuvette Array:

This refers to a plurality of cuvettes lined up next to one another, which are arranged in a stationary manner in the analyzer and are not moved along any of the x-, y- and z-axes during normal measurement operation.

Linear Cuvette Array:

This refers to a single row formed of a plurality of cuvettes arranged along a straight line.

Reagent Vessel:

Vessel or container for holding reagents which are required in order to carry out the analysis.

Sample Vessel:

Vessel or container which contains, in the analyzer, the analysis sample (the sample to be analyzed) from which multiple smaller sample quantities (aliquots) can be taken in order to analyze individual analytes or parameters. The analysis does not take place in the vessel of the analysis sample, but rather in the cuvette after the reagents have been added thereto, the cuvette in this sense serving as a reaction vessel.

Analysis Sample:

The material to be analyzed, which is introduced into the analyzer, is referred to as the analysis sample (usually simply called the sample or substance sample). This material is a liquid substance mixture and may be, for example, a body fluid such as blood serum, blood plasma, urine or cerebrospinal fluid. Other substance mixtures are, for example, drinking water, wastewater, wine, beer and fruit juices, and also liquids from chemical and biochemical production processes.

Analyte:

Those substances which are contained in an analysis sample and about which information is to be obtained using an analyzer via a chemical analysis with the aid of liquid reagents, that is to say which are quantitatively determined with the concentration being reported, are referred to as the analyte(s) (and also as parameters).

Analysis:

The quantitative determinations of an analyte that is contained in the analysis sample, which are carried out automatically by an analyzer with the aid of liquid reagents, are referred to as an analysis or test (or also as an immunoassay in the case of immunochemical analyses).

Pipetting Unit:

This refers to the entire system of an automatic pipetting device for transferring liquid between different vessels, which comprises one or more movable pipettors together with all the movable and stationary components necessary for the functioning thereof, including fluidics for supply purposes (hose connections, pumps, valves, containers, etc.), sensors, controller and power supply.

Pipettor:

This describes a component of the pipetting unit which is linearly movable horizontally in at least an x-direction relative to the holding vessels (cuvettes, sample vessels, reagent vessels). The pipettor includes a suspended component having at least one pipetting module which is movable in the y-direction, substantially normal to the x-direction.

Pipetting Module:

This refers to a device which is mounted on the pipettor and which is movable in the y-direction, said device comprising a holder which is movable in the vertical z-direction and which is intended to hold at least one cannula or hollow needle, together with the fluidic connection elements thereof.

Hollow Needle:

This refers to a needle or cannula which is mounted on a holder of the pipetting module and which is intended to aspirate liquids from the dispensing vessels and to discharge a metered amount of the aspirated liquids into the holding vessels.

Stationary Machine Component:

A machine component which is arranged in a stationary manner in the analyzer and which is not moved along the linear cuvette array during normal measurement operation.

Movable Machine Component:

This refers to a machine component which is arranged in a non-stationary manner in the analyzer and which can be moved and positioned at least along the linear cuvette array by means of a controlled drive during normal measurement operation.

Optical Elements for Collimation:

These are optical elements for creating a beam that is as parallel as possible. In principle, the light from a more or less punctiform source is transformed into a parallel ray bundle. Optical elements which align in a substantially parallel manner the light coming from an LED are, for example, converging lenses, TIR lenses, parabolic mirrors, and diaphragm arrangements.

Optical Elements for Filtering:

These are optical components, in particular interference filters, for filtering the transmitted light in a frequency-dependent manner, that is to say in a color-dependent manner for visible light. These components are usually established as dielectric layers on a thin carrier. Since the wavelength-dependent transmittance depends on the angle of incidence of the light, it is advantageous if the light beams impinging on the filter element run as parallel as possible and are oriented parallel to the optical axis.

Use is made of notch filters, longpass filters, shortpass filters, bandpass filters and dichroic interference filters. Particular preference is given to bandpass filters since these have a high transmittance for a particular wavelength band while absorbing shorter or longer wavelengths.

A) Analysis Systems Having Movable Reaction Vessels/Cuvettes Arranged in a Circular Manner on Turntables (Carousel Arrangement)

U.S. Pat. No. 8,911,685 B2 (HITACHI) discloses a typical automatic analyzer for carrying out chemical and biochemical analyses of liquid samples by means of photometric measurement methods. Essential features of these analyzers are the reaction vessels which are arranged at the periphery of a turntable and which at the same time act as cuvettes, and also device components which are arranged in a stationary manner around the circumference of the turntable, such as for example pipettors (sample dispenser, reagent dispenser), mixing device, optical measurement device and cuvette washing unit. The temperature control of the cuvettes may be integrated in the turntable, for example in the form of a temperature-controlled water bath. The sample containers are arranged on a sample turntable, and the reagents are located on a reagent turntable.

DE 11 2009 002 702 B4 (HITACHI) discloses another automatic analyzer, the sample containers and reagent containers of which are present in a carousel arrangement. The analyzer comprises a sample disk, on which a number of sample containers for holding a sample can be mounted; a first reagent disk and a second reagent disk, on each of which a number of reagent containers for holding a first reagent and a second reagent can be arranged; and a reaction disk, on which a number of cuvettes or reaction containers are arranged in the circumferential direction.

A sample dispensing device is provided between the reaction disk and the sample disk, which sample dispensing device dispenses into the reaction container a sample that has been aspirated at the sample container. In addition, a first reagent dispensing device is provided between the reaction disk and the first reagent disk, which first reagent dispensing device dispenses into the reaction container a reagent that has been aspirated from the reagent container on the first reagent disk. Similarly, a second reagent dispensing device is provided between the reaction disk and the second reagent disk, which second reagent dispensing device dispenses into the reaction container a reagent that has been aspirated from the reagent container on the second reagent disk. The sample dispensing device and the two reagent dispensing devices are arranged in a stationary manner at defined points around the circumference of the reaction disk.

Two stationary stirrers which stir the liquid in the reaction containers after the first reagent and the second reagent have been dispensed, a light source which sends light through the reaction containers, and a container cleaning mechanism for cleaning the reaction containers are provided at the outer circumference of the reaction disk in this order in the direction of rotation of the reaction disk.

A stationary spectroscopic system is arranged in a position opposite the light source such that the reaction disk is located therebetween. A signal processing circuit, which processes the signals from the spectroscopic system, is provided in the vicinity of the spectroscopic system. The signal processing circuit is connected to a computer.

Such analyzers are disadvantageous since all the processes are predefined by rigid clock cycles of the carousel and must take place in predetermined time windows. Actions such as dispensing, mixing, measuring and washing can take place only when the respective cuvettes are located at the positions of the respective device components.

For instance, a sample can be dispensed into an empty cuvette (not at any time but) only when the empty cuvette is moving past the position of the sample pipettor and the cuvette carousel stops at this position. A reagent can be dispensed into a cuvette containing the sample only when the cuvette in question is moving past the position of the reagent pipettor and the cuvette carousel stops at this position. The same applies to the stirring of reaction mixtures consisting of the sample and the reagents in the cuvettes by mechanical stirring, and to the optical measurement at the position of the optical measurement device.

For example, a particular cuvette also cannot be optically measured at any time or repeatedly at small time intervals, since it is first necessary to wait until the cuvette in question is located at the position of the optical measurement unit or is being guided past the latter "on the fly" during the measurement.

When reactions are complete, measurements cannot be carried out immediately, and in the case of kinetic measurements the time intervals between the individual measurements are relatively large (at least one revolution of the turntable). It is disadvantageous that, when measurements are complete, a cuvette cannot be immediately washed and made available for a new test. A cuvette can be washed and made available for a new test only when the cuvette in question is located at the position of the cuvette washing station and a washing stop takes place (is provided) at the position in question at a fixed point in time or for a fixed duration from the start of the test, according to the cycle times which in this concept are rigidly predefined. As a result, all the cuvettes are "blocked" for the same length of time, regardless of whether the measurement duration on the respective test is short or long.

The rotationally organized carousel arrangement with moving samples, reagents and cuvettes, but in particular the carousel concept with movable cuvettes and stationary machine components, results in relatively high throughput times for the individual tests and limits the number of tests that can be carried out per hour on a device having a particular number of cuvettes.

B) Analysis Systems Having Stationary Reaction Vessels/Cuvettes Arranged in a Circular Manner U.S. Pat. No. 5,178,833 A (BIOSEMA) discloses an automatic analyzer having measurement cuvettes and reagent vessels which are arranged in a circular manner and which are stationary relative to the device, the measurement cuvettes being arranged in an outer ring and the reagent vessels being arranged in two inner rings. The axis of rotation of a stationary pipettor is positioned in the center of the reagent vessel ring, said axis of rotation being encircled by a ring-shaped washing vessel for the lowerable pipetting needle of the pipettor. The sample vessels of the analyzer are located on a separate turntable at the periphery of the stationary cuvette ring. An optical measurement unit reaches the measurement cuvettes by means of a rotational movement about the central axis of the analyzer. The optical path leads through the liquid surface along the longitudinal axis of the individual measurement cuvettes. The pipetting needle reaches the sample vessels, the measurement cuvettes, the reagent vessels and the washing vessel by means of rotational movements of two horizontal arms of the pipettor about a first, central axis and a further axis.

It is disadvantageous that the disclosed configuration permits only one independently movable pipetting needle for samples and reagents, that the reagent store is limited to the area of the inner stationary rings, and that the optical path extends through the surface of the reaction liquid. It is particularly disadvantageous that the measurement cuvettes cannot be washed, but instead must be replaced by the outer ring in sectors after use.

C) Analysis Systems Having Movable Reaction Vessels/Cuvettes Arranged in a Linear Manner GB 1 321 754 A discloses an automatic analyzer having reaction vessels/cuvettes which are attached to circulating endless belts that can move in a linear manner.

US 2014/0287523 A1 (ABBOTT) likewise discloses an analyzer having reaction vessels or cuvettes which are arranged in a linear manner on belts. The linear endless belts are tensioned on two pulleys, with appropriate reaction vessels being attached in the longitudinal direction, for example in a "pretreatment lane" and in a "primary process lane". By rotating the pulleys, the reaction vessels or cuvettes can be moved back and forth in the running direction of the belt and can also move around the pulleys on the underside. The arrangement amounts to a "linear variant" of the conventional carousel arrangement, in which the reaction vessels or cuvettes move on a circular path. However, one feature common to both variants is that the reaction vessels or cuvettes are still moved relative to the device and are driven toward the processing stations (machine components). Therefore, substantially the same disadvantages as already mentioned in point A) occur.

WO 99/046601 A1 (HITACHI) discloses a linear, movable cuvette array with stationary device components (dispensers for sample liquid and reagents, mechanical stirrers, photometer and cuvette washing station). As shown in FIG. 1a of the present application, in WO 99/046601 A1 a plurality of cuvettes or reaction vessels 2 are arranged at predetermined spacings in a support frame or a transport bar 7 in a temperature-controlled chamber (water bath) 1. The cuvette contents are mixed for example by means of ultrasound. The transport bar containing the reaction vessels 2 is moved linearly in the direction of the arrow 9 by means of a drive unit 8. Also provided in addition to the temperature-controlled chamber 1 are a sample pipetting unit 3a, a reagent injection unit 3b, an optical measurement unit 4, a cuvette washing unit 5, and a first stirring mechanism 6a and a second stirring mechanism 6b for stirring the contents of the reaction vessels 2 again. The stirring mechanism 6a or 6b may also be designed as an ultrasonic generator, which acts on the reaction vessels 2 via the water bath in the chamber 1. In this embodiment variant, the water in the temperature-controlled chamber 1 is kept at a constant temperature, at which the reactions can take place and the optical measurement can be carried out.

During operation of the device, a reaction vessel 2 stops at the sample pipetting unit 3a, which dispenses the sample into the reaction vessel 2. Likewise, the reagent injection unit 3b discharges the reagent used for the analysis into the corresponding reaction vessel 2. In addition, the first stirring mechanism 6a stirs in order to mix the reaction solution, and the second stirring mechanism 6b stirs the mixture in the reaction vessel 2 again. The optical measurement unit 4 measures the absorption in the corresponding reaction vessel. Furthermore, the cuvette washing unit 5 discards the tested reaction solution and cleans the reaction vessel 2. Once these processes are complete, the drive unit 8 starts to move the reaction containers 2. As the reaction containers 2 move onward, the sample pipetting unit 3a, the reagent injection unit 3b, and the first and second stirring mechanisms 6a, 6b are washed in a cleaning unit. A number of chemical analyses are carried out by repeating the process above. As can be seen from the process above, the individual components of the device must be arranged in the stated order along the movement direction 9.

One disadvantage of this concept is that the transport bar 7 inevitably requires, to the left and to the right of the stationary device components 3a, 3b, 6a, 6b and 5, a large amount of free space for the linear movement of the reaction vessels 2. The longitudinal axis of the analyzer thus inevitably increases by at least twice the length of the transport bar 7.

The cuvettes or reaction vessels 2 of the device according to WO 99/046601 A1 are thus moved past the stationary device components, in a manner analogous to the turntable variant described above. The system is inflexible, and substantially the same disadvantages as already mentioned in point A) occur.

D) Systems Having Stationary Reaction Vessels/Cuvettes Arranged in a Circular and/or Linear Manner EP 2 309 251 A1 (SIEMENS) discloses an automatic analyzer having stationary sample vessels or cuvettes which are present in a circular or linear arrangement, wherein the optical measurement unit is formed on a rotatable device such as to be movable along the sample vessels. According to one embodiment variant, the rotatable device, which carries the light source in the form of an LED and the photodetector in the form of a photodiode, may be arranged below the receptacle for the sample vessels, as a result of which it is possible at all times to access the sample vessels by means of a gripping arm. The rotatable device may also have a plurality of LEDs of different wavelengths and a plurality of photodiodes, so that the samples can be measured at multiple wavelengths. The photodiodes may be replaced by a CCD element.

The arrangement described in EP 2 309 251 A1 is unsuitable for example for clinical chemical analyzers (CC analyzers) and is directed to an analyzer for hemostatic measurements (for determining blood coagulation). This arrangement may also be part of a system composed of multiple devices (for example PCR analyzer, cooling device). The sample vessels are not reused, but instead are optionally passed on to other components of a system, for example are disposed of by means of a gripping arm or after the coagulation parameters have been determined.

Only whole blood (blood plasma with the blood cells contained therein) in a form that is as undiluted as possible is suitable as a sample in the case of coagulation measurements. In contrast, whole blood is completely unsuitable for photometric transmitted-light measurements, since the blood cells scatter the light and thus the measurement results would be distorted. Therefore, analyzers comprising such photometers always use cell-free analysis samples, such as for example blood plasma or blood serum, which in addition are heavily diluted by the addition of reagents.

According to EP 2 309 251 A1, the vessels with the samples therein (optionally after the addition of reagents) are used directly for the optical measurement.

In an analyzer according to the present invention, measurements are always carried out using cell-free analysis samples, for example body fluids such as blood plasma/blood serum, urine and cerebrospinal fluid, substance mixtures such as for example drinking water, wastewater, wine, beer and fruit juices, and liquids from chemical and biochemical production processes, which are introduced into the device by means of sample vessels, after which aliquots of the samples are transferred by means of a pipettor, together with reagents, into separate cuvettes, on which a photometric measurement is then carried out.

E) Laboratory Robots and Automatic Pipetting and Analysis Devices for Preparing and/or Analyzing Samples Using Stationary Reaction Vessels/Cuvettes in a 2D Arrangement (Microtiter Plate)

A typical analysis device for carrying out biochemical analyses of liquid samples using microtiter plates is known for example from EP 0 259 386 B1 (TECAN). The analysis device comprises a primary rack for holding a plurality of sample vessels, a cross-table which can be positioned next to the primary rack in the x-y direction and which is designed to hold a microtiter plate, a sample distributor arm which is arranged above the primary rack and the cross-table and which can be positioned as desired in an upper horizontal plane, and a photometer which is arranged within the positioning area of the cross-table and the beam path of which passes perpendicularly through the x-y plane of the cross-table.

Another example of a machine for automatically preparing and analyzing samples in the wells of a microtiter plate is known from DE 10 2004 057 450 B4 (CYBIO).

There are many machines of this type which use microtiter plates for detecting and determining substances. Microtiter plates contain a large number of mutually isolated wells in rows and columns (2D arrays). They are used for a wide range of procedures. The pipetting takes place either manually or, in the case of high throughput screening (HTS), with the aid of pipetting robots. Photometric determinations, for example absorption measurements on microtiter plates in transmitted light using photometers, take place in such a way that the beam path passes through the well in a perpendicular direction through the liquid surface. However, for precise quantitative determinations, it is essential to guide the light beams through the measurement liquid over paths and distances which are known and which are defined as precisely as possible. Any light scattering on particles, turbidity, inlet faces, surfaces (for example liquid surface, cuvette wall) leads to light losses, which on the other hand distort the measurement result.

EP 2 410 342 A2 (HOFFMANN-LA ROCHE) discloses a pipetting device having a pipettor with multiple flat frame elements which are arranged next to one another and which, together with the pipetting needles thereof, are jointly movable on a main frame body in a horizontal x-direction that is normal to the main frame body. The pipetting device serves to transfer samples or reagents from a first row of vessels to a second row of vessels which is offset in the x-direction. The pipetting needles are first adjusted in the y-direction to the spacing of the vessels of the first row in order to take up sample liquid or reagent liquid, and then are adapted to the spacing of the second row of vessels in order to dispense the sample liquid or reagent liquid. However, an independent movement of two pipetting needles in the x- and y-direction is not provided. Movement modules for the y-direction and the z-direction (lifting and lowering of the pipetting needles) are arranged in gaps in flat, adjacent frame elements in order to keep the spacing between the individual pipetting needles small. However, an independent movement of the pipetting needles in the y-direction is possible only to a limited extent. For example, it is not possible for the frame elements on the transfer arm to move past one another, which results in a mutual restriction of the freedom of movement of the pipetting needles in the y-direction. Such pipetting devices find a useful application in connection with microtiter plates in particular.

EP 1 230 553 B1 (MAXMAT) discloses a chemical or biological analyzer which has a storage module for sample tubes and tubes for reagents. Also provided is an analysis module having a reaction container in the form of a microtiter plate and a sample-taking module (pipettor) which is movable on a rail and which has two pipetting needles arranged at a fixed distance from one another, which pipetting needles operate independently of one another in the z-direction in order to take samples automatically and are each equipped with a retractable aspirating pipette for transferring predetermined quantities of samples and reagents from the storage module to the analysis module. The two pipetting needles are movable only jointly in the horizontal x/y plane.

The analysis module has a heating plate for the microtiter plate, which heating plate is arranged close to the lower region of the wells of the microtiter plate in order to heat the contents of the wells by convection. The sample-taking unit further comprises a mixing device which is controlled by an electromagnet in order to bring about an alternating back-and-forth movement of the pipetting needle when the latter is in a lowered position in a well of the microtiter plate, so as to thoroughly mix the mixture consisting of samples and reagents.

U.S. Pat. No. 5,897,837 A (TOA MEDICAL) discloses a pipetting machine suitable for pretreating samples for an immunoassay analyzer, having a first block of a pipettor which is movable horizontally in the x- and y-direction and which is equipped with two pipetting needles next to one another, it being possible for said pipetting needles to be lowered or lifted independently of one another. In this case, one of the two needles may be assigned to reagents, and the other needle may be assigned to samples. In addition, a second block is also present, which is movable in the x-y direction and has a lowerable pipetting needle. In order to clean the needles, it is necessary to move to a stationary needle washing station. The two pipetting needles of the first movable block can disadvantageously only be moved jointly in the horizontal x/y plane. This has the disadvantage that the weights of the robotics components of the pipettor cannot be distributed across the two horizontal movement axes x and y, so that the weight of the second pipetting unit must always also be accelerated in order to move to positions in the y direction. Likewise, the weight of the needle washing unit together with the needle washing vessel must also always be accelerated in both horizontal directions. Furthermore, due to the joint horizontal movement, it is not possible to use both needles simultaneously for pipetting at different, non-adjacent positions of a vessel row.

U.S. Pat. No. 8,675,187 B2 (Hitachi) describes an optical measurement unit for obtaining measurement signals from liquid media, and an analysis system equipped therewith. As shown in FIG. 1b of the present application, one of multiple reaction vessels 24 arranged in a circular manner on a turntable 23 is immersed in a temperature bath 25, which is filled with water 26 at a constant temperature. A photometer 27, which is fixedly arranged in the temperature bath 25, has an LED light source 28, the light from which is irradiated into the sample 31 present in the reaction vessel 24 by means of a condenser lens 29 and a deflecting mirror 30. A semiconductor laser may also be used as the light source. A photodetector 32 of the photometer 27 is arranged on the opposite side of the reaction vessel 24. Diaphragms 34 for the inlet and outlet radiation are provided on the inlet side and on the outlet side of the reaction vessel 24 at the measurement position 33 of the photometer 27. One disadvantage is the mechanical and metrological complexity associated with reaction vessels which are arranged in a circular manner on a turntable, since the individual reaction vessels 24 have to be moved into a measurement position of the photometer 27 in order to measure the samples.

US 2013/0301051 A1 (Pogosyan) describes a cost-effective, portable photometer which has a plurality of LEDs of different wavelengths as the light sources and a photodiode or a photomultiplier as the detector. The photometer can be used to analyze chemical, biological or pharmaceutical samples which are located in a sample holder between the light sources and the detector. The light from the light sources is directed onto a light-scattering surface and passes through a collimator lens and a slit diaphragm in order to reach the sample present in the sample holder. As shown, the detector can be pivoted from a first position to a second position. In the illustrated geometry, a collimator lens functions optimally if the scattering surface is selected to be very small, almost punctiform, but this reduces the light output.

U.S. Pat. No. 8,064,062 B2 (Beckmann) discloses a photometer with a stationary LED array comprising a plurality of light sources and a stationary detector array comprising a plurality of photodiodes, wherein one photodiode is assigned to each light source. The cuvettes located on a turntable are arranged between the LED array and the detector array. During a rotational movement of the cuvettes, the optical beam paths are crossed and the light of different wavelengths can be successively applied to the samples in the cuvettes.

F) Pipetting Devices or Pipetting Machines for Analysis Systems

U.S. Pat. No. 5,897,837 A (TOA MEDICAL) discloses an automatic pipetting device or a pipetting machine for pretreating samples for an immunoassay analyzer. As shown in FIG. 1c of the present application, the pipetting machine 10 has a first pipettor 20 which is movable horizontally in the x- and y-direction and which is equipped with two pipetting needles 11 and 12, which pipetting needles can be vertically lowered or lifted independently of one another. In this case, one of the two needles 11 can be assigned to reagents, while the other needle 12 is assigned to samples, which are arranged in different sections 14 to 19 of a table plane 23. In addition, a second pipettor 21 is also present, which is movable in the x-y direction and has a lowerable pipetting needle 13.

The first, horizontally movable pipettor 20 carries a needle washing unit 22, which is movable horizontally back and forth between the vertical lowering paths of the two pipetting needles 11, 12. In an alternating manner, a respective one of the two needles can be cleaned, while the other needle carries out a pipetting operation. The two pipetting needles 11, 12 of the first pipettor 20 can be moved only jointly in the x- and/or y-direction.

This has the disadvantage that the weights of the robotics components of the pipettor 20 cannot be distributed across the two horizontal movement axes x and y, so that the weight of the second pipetting unit must always also be accelerated in order to move to positions in the y-direction. Likewise, the weight of the needle washing unit 22 together with the needle washing vessel must also always be accelerated in both horizontal directions.

In addition, DE 10 2005 049 920 A1 (MANZ AUTOMATION) discloses a robot assembly for the life sciences field, which comprises a plurality of robot modules 131. As shown in FIG. 1d of the present application, each of the couplable modules 131 is equipped with a stationary X-axis arm 132, on which at least one Y-axis arm 133 is arranged such as to be movable in the X-direction. A coupling device for detachably coupling a work module 134 is provided on the Y-axis arm 133, said coupling device being movable in the Y-direction. The work module 134 may be designed as a pipetting module having a plurality of pipetting needles 135, or else as a gripper module. The samples 136 to be pipetted are arranged on a work deck 137, wherein an exchangeable dispensing module 138 is arranged in a column 139 which connects the work deck 137 to the X-axis arm 132, said dispensing module being connected to the work module 134 via hose lines. According to one embodiment variant, the Y-axis arm 133 may have two coupling devices for work modules 134 on opposite sides of the Y-axis arm 133. The coupling devices are then movable in the Y-direction independently of one another. A plurality of modules 131 can be coupled in such a way that the X-axis arms thereof adjoin one another, wherein the Y-axis arms on neighboring modules can be moved but cannot be moved past one another.

G) System Components for Mixing and Temperature Control for Automatic Analyzers

A temperature-controllable cuvette arrangement has become known from DE 27 26 498 A1 (HELLMA). As shown in FIG. 2a of the present application, a temperature-controllable cuvette block 55 is provided which has a plurality of receiving shafts 56, into which cuvettes 57 can be inserted. The cuvettes 57, which taper conically in the downward direction and have lateral measurement windows 58, are inserted with a form fit into a U-shaped adapter 59 which has good thermal conductivity and which thus establishes thermal contact with the cuvette block 55 via the walls 60 of the receiving shaft 56. The sample/reagent mixture in each of the cuvettes 57 can in each case be optically measured through a measurement channel 61 in the cuvette block 55.

One disadvantage here is that the temperature of the sample/reagent mixture heats up only slowly to the temperature of the cuvette block. It is thus more difficult to achieve a high sample throughput in an analyzer, since the temperature control when analyzing a sample always counts among the processes that take the most amount of time.

JP 2007-303964 A (OLYMPUS) discloses—as shown in FIG. 2b of the present application—a device for controlling the temperature of cuvettes 62 which are arranged in receptacles of a rotatable carousel 63. The device has a piezoelectric substrate 64 which is attached to the side wall of each cuvette 62 and on which there is integrated both an electrode structure of an interdigital transducer (IDT) as an ultrasonic transducer 65 and a temperature sensor 66 for non-invasively measuring the temperature of the cuvette contents. A temperature regulating unit 68 of a control unit 69, which is connected via sliding contacts 67, forms together with the driver unit 70 for the ultrasonic transducer 65 a control loop for controlling the temperature of a reaction mixture in the cuvette 62. The sample/reagent mixture is heated directly to the target temperature by absorbing ultrasonic energy.

One disadvantage here is that each cuvette 62 requires an adhesively bonded piezoelectric substrate 64 with an integrated temperature sensor 66, which must be brought into contact with an electronic regulating unit 68. In addition, the temperature measured on the substrate of the ultrasonic transducer 65 may be distorted by the self-heating of the ultrasonic transducer and thus does not correspond to the temperature of the sample/reagent mixture in the cuvette 62.

Furthermore, the temperature sensor 66 is not in contact with the liquid, but rather can sense the temperature of the liquid only indirectly via the heat conduction of the vessel wall of the cuvette 62, as a result of which, particularly in the case of very rapid heating of the liquid, a rise in temperature in the liquid cannot be measured with sufficient speed and accuracy to be able to rule out a lasting or transient exceeding of the target temperature by a value that is critical for the sample constituents.

EP 1 995 597 A1 (OLYMPUS) discloses a device for stirring liquids in cuvettes 71 which—as shown in FIG. 2c of the present application—are arranged on a rotatable carousel 72, wherein a sound generator 73 (interdigital transducer (IDT)) for irradiating ultrasonic energy into the cuvette 71 is adhesively bonded to the side wall of each cuvette. According to EP 1 995 597 A1, however, measures must be taken to limit an undesired increase in temperature of the cuvette contents which occurs as a result of sound absorption, and to prevent distortion of the analysis results due to thermal damage.

The critical heat input brought about by operation of the sound generator 73 is calculated by thermal characteristics of the cuvette contents, which are stored in a control unit 74. The heat input can be limited to a non-harmful value by limiting the operating time, by modulating the amplitude, or by varying the operating frequency of the ultrasonic generator. According to a further measure for limiting the heat input, a dedicated Peltier element 76 can be applied directly to the substrate of the adhesively bonded sound generator 73 by means of an actuator 75 for each cuvette 71, in order to actively cool said sound generator during operation. The power of the Peltier element 76 is controlled via stored operating parameters, no temperature measurement being provided on the Peltier element. The signal generator 77 for the sound generator 73 is actuated by a driver unit 78 of the control unit 74.

A precise temperature control of the liquids in the cuvettes 71 by suitable parameterization alone is thus not possible or provided since a precalculated input of ultrasound would on its own be too inaccurate to achieve a target temperature.

In order to control the mixing or stirring process more precisely, and to ensure that a harmful temperature value is not exceeded during stirring, a temperature measurement of the liquid may be carried out from above by a stationary infrared sensor, but this can be carried out in each case only on one particular cuvette of the carousel while the latter is at a standstill.

Compared to a block temperature control in a cuvette holder of constant temperature, a temperature control having the aforementioned technical features has the disadvantage that the system can be regarded as not inherently safe with regard to exceeding the target temperature during the heating and regulation.

JP 2007-010345 A (OLYMPUS) describes an ultrasonic stirring device, by which the contents L of a cuvette 81 can be mixed. As shown in FIG. 2d of the present application, a piezoceramic ultrasonic generator (thickness-mode transducer 83) is adhesively bonded to the bottom 82 of the cuvette 81, wherein the shape and the material of the cuvette bottom forms an acoustic lens 84 for focusing the ultrasonic energy at the point F just below the liquid surface. The thickness-mode transducer 83 made of lead zirconate titanate ("sounding body") comprises a flat disk 85 with flat electrical contacting 86 on both sides, having a diameter which is larger than that of the cuvette bottom 82.

SUMMARY OF THE INVENTION

One object of the invention is to avoid, in automatic analyzers for carrying out chemical, biochemical and/or immunochemical analyses of liquid samples, the disadvantages mentioned above, particularly in connection with the sample throughput of known systems, which is limited by the processes that are predefined by rigid clock cycles and that take place in predetermined time windows, and to propose improvements which increase the sample throughput without significantly increasing the cost of the individual analysis or of the analyzer, while at least maintaining the quality of the analysis. In addition, the aim is to propose an improved method for automatic chemical, biochemical and/or immunochemical analysis of liquid samples.

This object is achieved according to the invention by an analyzer having cuvettes for holding the liquid samples and reagents, each cuvette having a lateral inlet window and at least one lateral outlet window, wherein a plurality of cuvettes is arranged as at least one stationary, linear cuvette array in the analyzer, having movable and stationary machine components, at least comprising:
- a pipettor which is designed to be movable in the x-direction along a line of movement defined by the linear cuvette array, said pipettor being equipped with at least one pipetting module which is movable in the y-direction, substantially normal to the x-direction, the at least one hollow needle of said pipetting module being designed to be lowerable in the z-direction into the cuvettes and also into individual vessels of the sample store and/or reagent store,
- a mixer unit for mixing the samples and reagents in the cuvettes,
- an optical measurement unit,
  - comprising a stationary light-supplying unit which has at least one light distributor device which feeds the light from a plurality of LED light sources emitting in a spectrally different manner in the UV/VIS/NIR wavelength range into the inlet windows of the individual cuvettes of the cuvette array, and
  - comprising a stationary detection unit which is assigned to the outlet windows of the cuvettes and which has a plurality of photodiodes,
- a cuvette washing unit, designed to be movable in the x-direction, for cleaning the cuvettes,
- a needle washing unit for cleaning the at least one hollow needle,
- a stationary temperature control unit for setting a predefinable measurement temperature in the cuvettes, and
- an evaluation and control unit, wherein the light distributor device has a cavity, the inner surfaces of which are designed to be at least partially mirrored and/or diffusely reflective, and wherein at least one photodiode is fixedly assigned to each cuvette of the stationary cuvette array.

One significant advantage of the analyzer according to the invention with its special optical measurement unit is that the cuvettes are arranged as an immovable, stationary cuvette array, wherein the individual detectors (transmitted-light detector and/or scattered-light detector) of the optical measurement unit are fixedly assigned to each cuvette, and therefore the light exiting from the individual cuvettes—that is to say also any dark signals—can be measured from each cuvette in a temporally unlimited manner. It is thus not necessary to measure when moving past the detectors, or to position a detector sequentially in front of a plurality of cuvettes in stop-and-go operation. As a result, more accurate measurement results can be obtained, and measurement processes are made much more flexible.

It is also advantageous if the light-supplying unit has at least one stationary light distributor device which distributes the light from the individual LED light sources among the individual cuvettes of the cuvette array, wherein the light distributor device has a cavity, the inner surfaces of which are designed to be at least partially mirrored and/or diffusely reflective. In this case, the light distributor device may have, for each LED light source, an inlet opening for feeding the light into the cavity and, for each cuvette of the cuvette array, an outlet opening for feeding the light into the cuvette.

This is a compact, cost-effective embodiment, since the light distributor device, which accommodates a plurality of LED light sources of different wavelength, is assigned in a stationary manner to a row of cuvettes.

In the case of cuvette arrays having a large number of cuvettes, the stationary cuvette array may be segmented, wherein a separate light distributor device is fixedly assigned to each segment. Overall, therefore, this results in an optical measurement unit which has no moving components.

For uniform distribution of the light irradiated into the light distributor device by the individual LED light sources of different wavelength, the inner surface of the light distributor device that is located opposite the inlet openings of the LED light sources is preferably designed to be corrugated and reflective. Although different light paths may occur between individual LED light sources and cuvettes, it is possible on account of the constant geometric conditions for intensity differences to be compensated by calculation and/or by calibration measurements.

In order to homogenize the measurement radiation entering the cuvettes, the inner surface of the light distributor device that is located opposite the outlet openings to the cuvettes is designed to be diffusely reflective.

The method according to the invention for automatic chemical, biochemical and/or immunochemical analysis of liquid samples, which are present in a sample store of an analyzer, with the aid of liquid reagents, which are present in at least one reagent store of the analyzer, in order to determine at least one analyte concentration in the sample, is characterized by the following steps:
- transferring a predetermined quantity of a liquid sample from a sample vessel in the sample store into a cuvette of a stationary, linear cuvette array with the aid of at least one pipettor which is movable along the cuvette array, by means of a hollow needle of a first pipetting module or a hollow needle of a second pipetting module of the pipettor, which is movable independently of the first;

transferring a predetermined quantity of a reagent liquid from a reagent vessel of the reagent store into the cuvette of the stationary, linear cuvette array by means of a hollow needle of the first pipetting module or by means of a hollow needle of the second pipetting module of the at least one pipettor which is movable along the cuvette array;

optionally transferring a predetermined quantity of a further reagent liquid from a reagent vessel of the reagent store into the cuvette of the stationary, linear cuvette array by means of a hollow needle of the first or second pipetting module of the at least one pipettor which is movable along the cuvette array;

in each case washing the needle used for a pipetting process, after each pipetting process;

in each case mixing and controlling the temperature of the liquids in the cuvette after adding a reagent liquid;

photometrically measuring the contents of the cuvette by means of an optical measurement unit arranged along the cuvette array, said optical measurement unit comprising a stationary light-supplying unit and a stationary detection unit; and determining at least one measured value;

calculating and displaying the analyte concentration based on the determined measured value and on previously known or predetermined reference values and calibration values;

washing and drying the cuvette by means of a cuvette washing unit which is movable along the cuvette array; and providing the cuvette for subsequent analysis.

At least two of the machine components are designed to be movable in the x-direction independently of one another: the pipettor (in the simplest case a single pipettor having a single pipetting module) and the cuvette washing unit. The mixer unit may be stationary or movable, and the optical measurement unit and the temperature control unit are stationary. It should also be noted that two different, movable machine components which access the cuvette openings cannot access the same cuvette simultaneously. In practice, however, it is in any case not necessary for the pipettor and the cuvette washing unit, for example, to access the same cuvette "simultaneously". It should also be noted that stationary machine components are designed such that they access each cuvette anyway, for example as a result of the fact that one such machine component is assigned to each cuvette or group of cuvettes.

Due to the free choice of access of the machine components which are movable in the x-direction, in particular of the cuvette washing unit to any desired cuvettes and of the at least one pipettor (having at least one pipetting module) to any desired sample vessels, reagent vessels and cuvettes, the throughput increases significantly compared to a machine having the same number of cuvettes which is organized in a rotational manner.

According to one advantageous embodiment variant of the invention, the analyzer has two pipettors which are movable in the x-direction independently of one another.

Compared to the variant having one pipettor, this leads to a further increase in throughput due to the fact that the first pipettor can pipette samples into a first cuvette while the second pipettor can simultaneously pipette reagents into a freely selectable second cuvette.

According to the invention, it is also provided that at least one pipettor has two pipetting modules which are movable in the y-direction independently of one another and parallel to one another, each of the pipetting modules having at least one hollow needle. The two pipetting modules of a pipettor can thus move past one another, independently of one another, in the y-direction, without colliding.

According to this advantageous variant, two different needle types can also be used (for example for different pipetting volumes, with specific coatings for different types of sample and reagent, without requiring another pipettor or a needle exchange station).

One particularly advantageous variant of the invention provides that the needle washing unit is arranged on the pipettor and is designed to be movable therewith.

The measure whereby a hollow needle of one pipetting module can pipette while a hollow needle of the second pipetting module is simultaneously being cleaned also serves to increase the throughput. Advantages are obtained even when there is just one pipetting module on the pipettor, since the pipettor need not move to a stationary needle washing unit each time. Since the y-movement of the respective pipetting modules can take place independently of the needle washing unit carried on the pipettor, the moving masses of the robotics components can be split across the two horizontal axes, so that the needle washing unit only has to be accelerated in the x-direction.

The measurement method according to the invention is also characterized in that, for photometrically measuring the contents of the cuvettes, light is irradiated into at least one light distributor device of the stationary light-supplying unit—in temporal succession—by a plurality of LED light sources which emit in a spectrally different manner in the UV/VIS/NIR wavelength range, the light distributor device optically contacting at least one segment of the cuvette array, in that the light from the individual LED light sources is fed into lateral inlet windows of the individual cuvettes of the cuvette array, and in that the measurement radiation exiting from lateral outlet windows of the cuvettes is detected by means of at least one photodiode, fixedly assigned to each cuvette, of a stationary detection unit.

Due to the stationary light distributor device and the detectors assigned individually to each cuvette, it is not necessary to measure when moving past the detectors, or to position a detector sequentially in front of a plurality of cuvettes in stop-and-go operation.

Another advantage is that the individual detectors (transmitted-light detector (for photometric and turbidimetric measurements) and/or scattered-light detector (for nephelometric measurements)) are fixedly assigned to each cuvette, and that the light exiting from the individual cuvettes—that is to say also any dark signals and possibly incident ambient light—can be measured from each cuvette in a temporally unlimited manner for the purpose of correction. As a result, more accurate measurement results can thus be obtained from each cuvette in very short time intervals (<1 second), and therefore measurement processes can be made shorter and much more flexible.

The measurement radiation exiting from the cuvettes is converted into an electrical measurement signal and, after being suitably prepared, is displayed in a display unit.

The analyzer also has a mixer unit, for example a hollow needle of a pipetting module that can be set in rotation or in vibration, which can be lowered into the respective cuvettes in order to mix the samples and reagents.

The analyzer has a cuvette washing unit, which according to the invention is designed as a movable machine component which in each washing position has access to one cuvette or to a group of cuvettes simultaneously, preferably to two to five cuvettes arranged next to one another. The cuvette washing unit may also have a stirring element, which can be lowered into the respective cuvettes in order to mix the samples and reagents.

According to the invention, the analyzer may have a temperature control unit for setting a predefinable measurement temperature, which temperature control unit comprises heating foils which thermally contact individual cuvettes or groups of cuvettes and to which different temperature levels can be applied. Alternatively, the individual cuvettes or groups of cuvettes may also be accommodated in a temperature-controllable cuvette block, which at the same time serves as a cuvette holder.

The cuvettes have, in a region close to the bottom, inlet and outlet windows which are preferably arranged plane-parallel to one another and which are transparent to the inlet and outlet radiation or measurement radiation of the optical measurement unit.

BRIEF DESCRIPTION OF THE DRAWINGS

The invention will be explained in greater detail below on the basis of exemplary embodiments, which are partially schematic and in which:

FIG. 2a to FIG. 2d show devices for mixing and stirring liquids in cuvettes, according to the prior art, FIG. 8a shows a sectional illustration of the light-supplying unit according to FIG. 7a along the line II-II in FIG. 8b, FIG. 8b shows a sectional illustration of the light-supplying unit according to FIG. 7a along the line III-III in FIG. 8a, FIG. 8c shows a three-dimensional detail illustration of a tubular body of the light-supplying unit according to FIG. 8a, FIG. 8d shows an enlarged detail illustration from FIG. 8a, FIG. 8e shows a variant of the light-supplying unit in a sectional illustration according to FIG. 8a, FIG. 8f shows the variant of the light-supplying unit according to FIG. 8e in a sectional illustration along the line IV-IV in FIG. 8e, FIG. 8g to FIG. 8i show three different detail variants of the beam guidance on the inlet side and outlet side of a cuvette in a sectional view according to FIG. 8f, FIG. 19b shows a temperature diagram to illustrate a second exemplary embodiment of a temperature control and mixing process for a liquid.

Parts which have the same function are provided with the same reference signs in the embodiment variants.

DETAILED DESCRIPTION

Figure 1B:
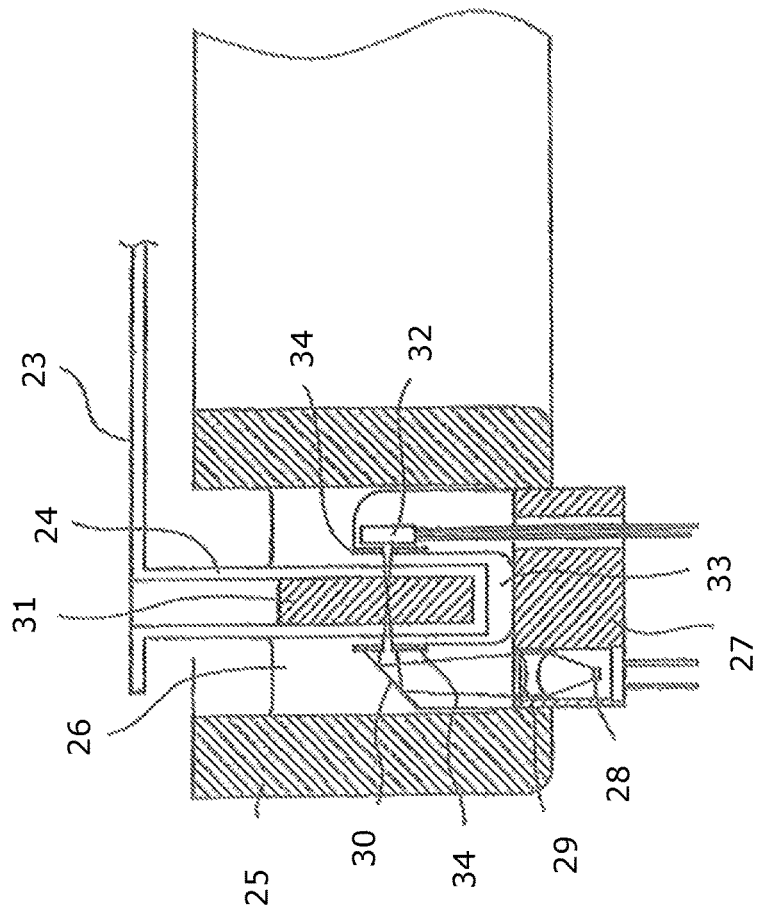
FIG. 1b shows an automatic analyzer having cuvettes arranged in a circular manner on a turntable, together with an optical measurement unit, according to the prior art.
Figure 1A:
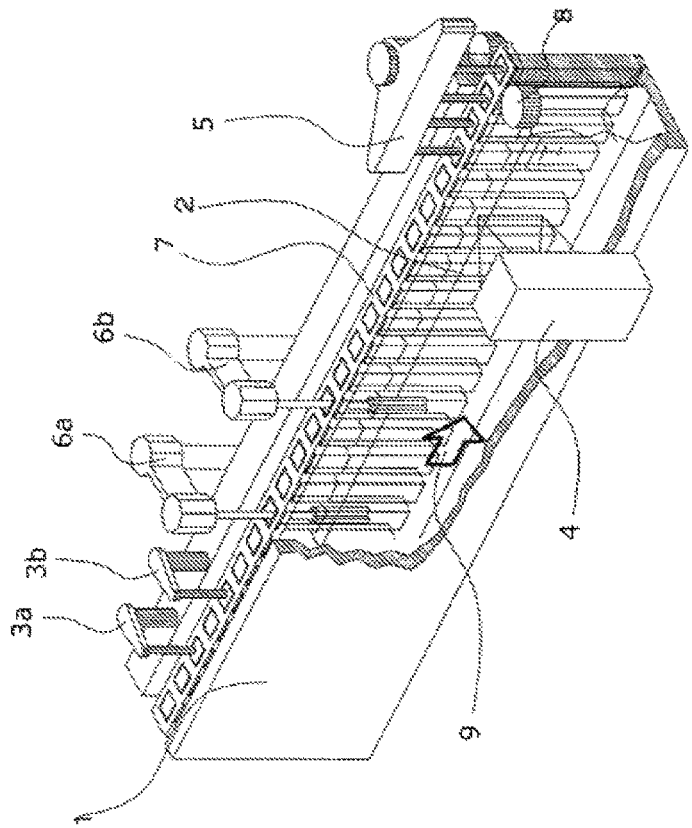
FIG. 1a shows an automatic analyzer having movable reaction vessels or cuvettes arranged in a linear manner, according to the prior art.
Figure 1D:
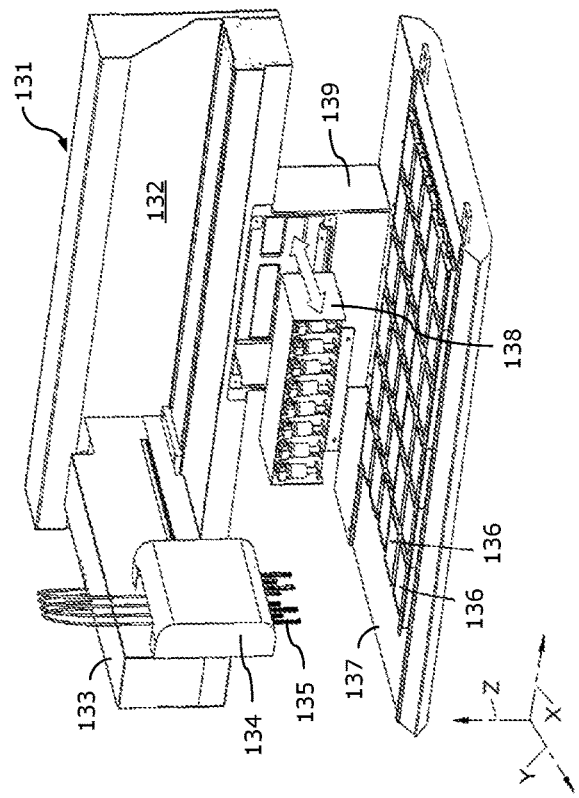
FIG. 1c and FIG. 1d show an automatic pipetting device for transferring samples and reagents according to the prior art, in a three-dimensional view in each case.
Figure 1C:
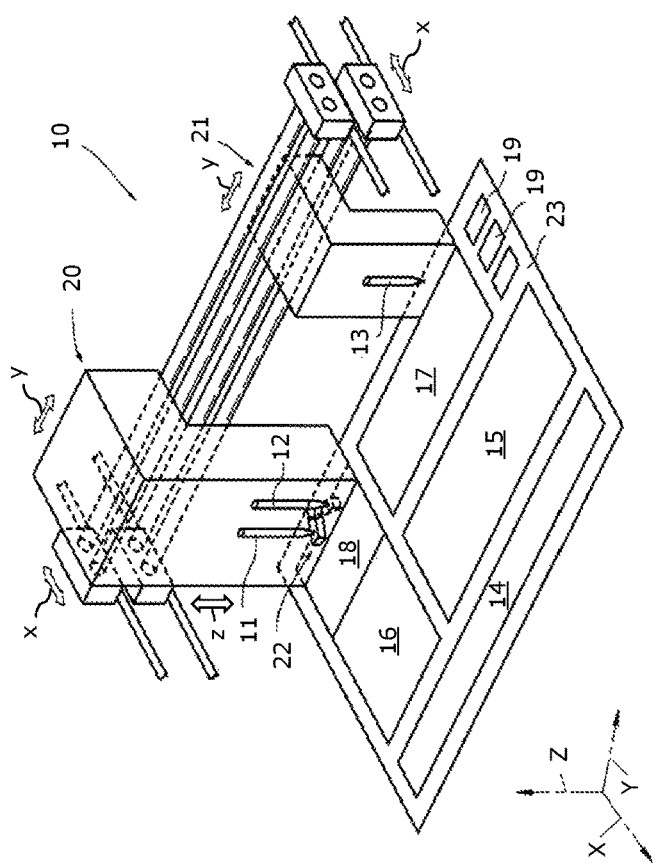

The automatic analyzers shown in FIGS. 1a and 1b, the pipetting devices shown in FIGS. 1c and 1d, and the system components shown in FIGS. 2a to 2d for mixing and temperature control relate to examples from the prior art and are described at length in the introductory part of the description.

Figure 3:
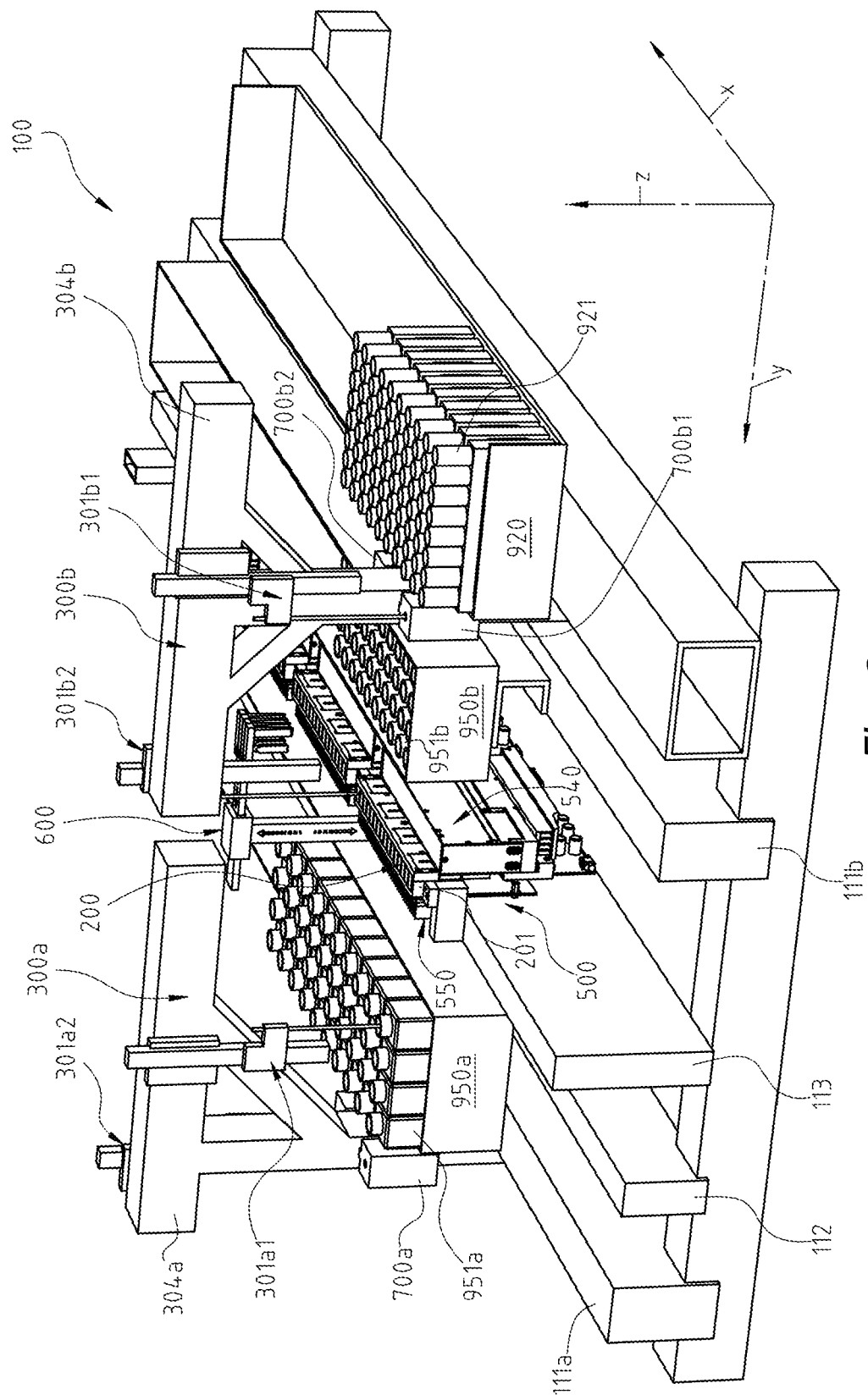
FIG. 3 shows an automatic analyzer according to the invention for carrying out chemical, biochemical and/or immunochemical analyses of liquid samples, comprising two pipettors on a linear, stationary cuvette array, in a three-dimensional overall view.
Figure 4:
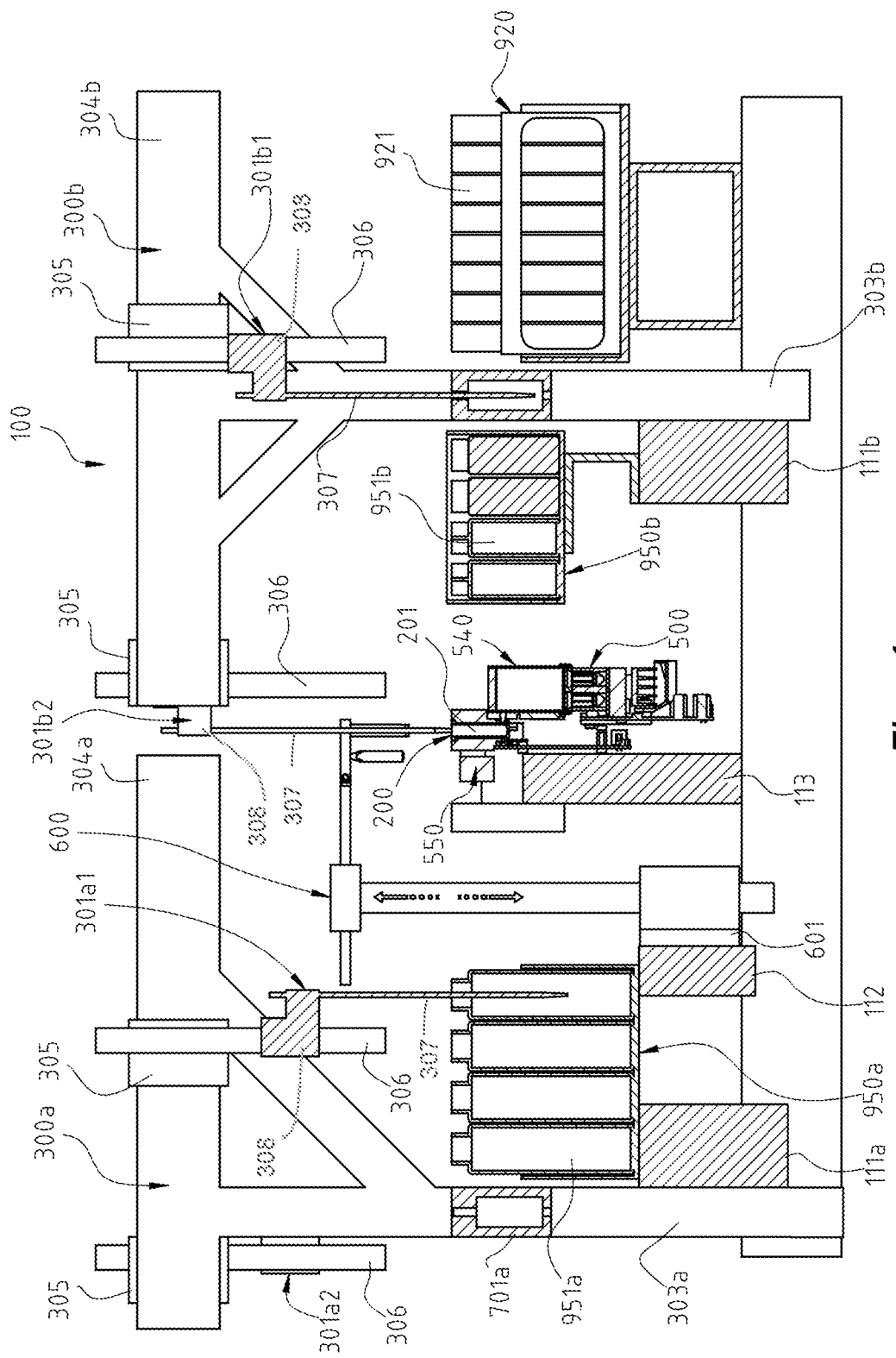
FIG. 4 shows a sectional illustration of the analyzer along the line IV-IV in FIG. 5.
Figure 5:
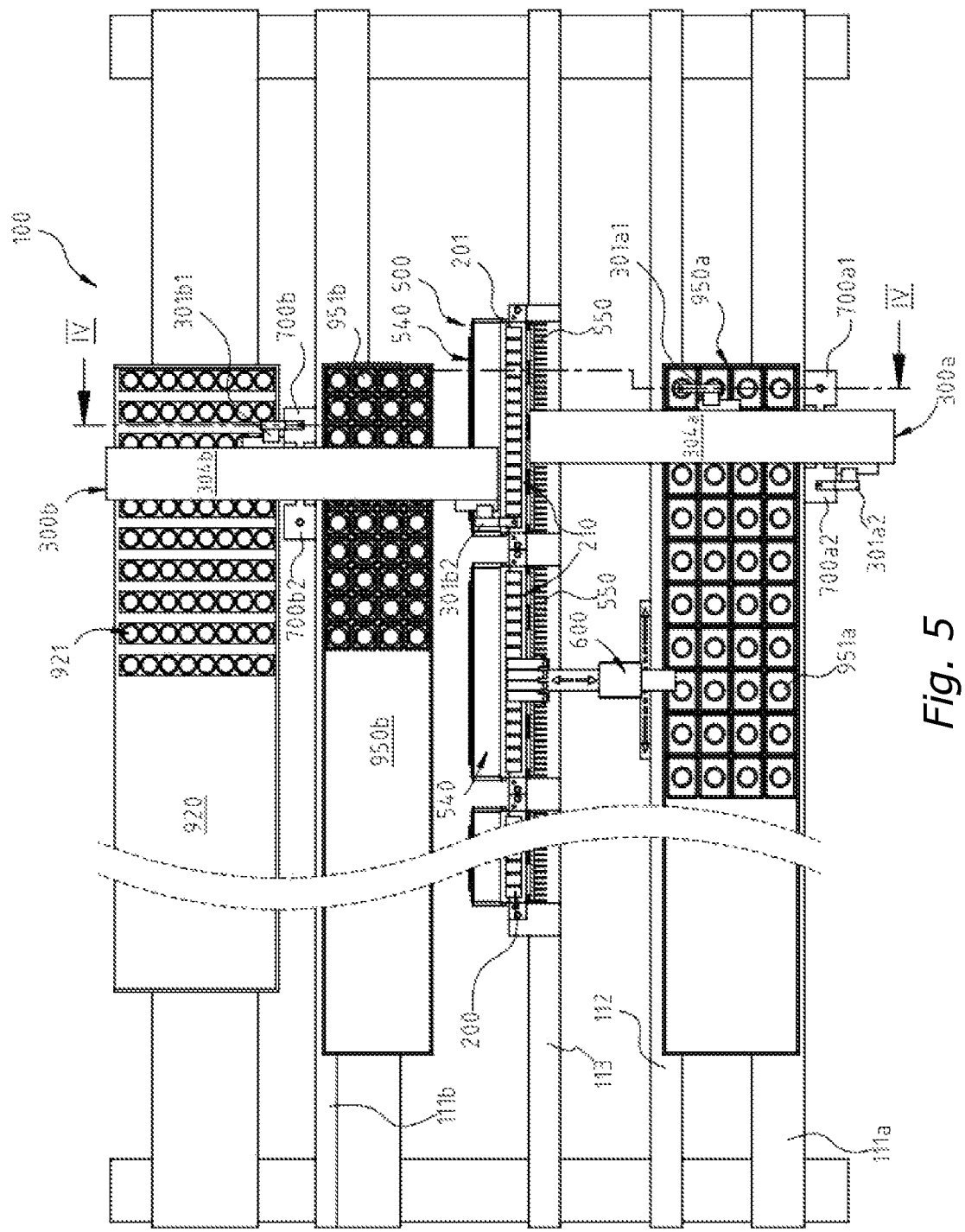
FIG. 5 shows a simplified plan view of the analyzer according to FIG. 3.

The automatic analyzer 100 shown in FIGS. 3 to 5 is used to carry out chemical, biochemical and/or immunochemical analyses of liquid samples. For the sake of simplicity, only those components of the analyzer 100 which are essential to the present invention are shown, wherein analyzer components such as pumps, valves, evaluation units, control units and drive units will not be discussed in detail.

The liquid samples are present in sample vessels 921 in a sample store 920 of the analyzer 100 and are analyzed with the aid of liquid reagents which are present in reagent vessels 951a, 951b in two reagent stores 950a, 950b of the analyzer 100.

The cuvettes 201 for holding the liquid samples and reagents are arranged in the form of a stationary, linear cuvette array 200 in the analyzer 100 and remain at their original position during a plurality of individual analyses. In the illustrated example, the cuvette array 200 is arranged between the first reagent store 950a and the second reagent store 950b.

Figure 9:
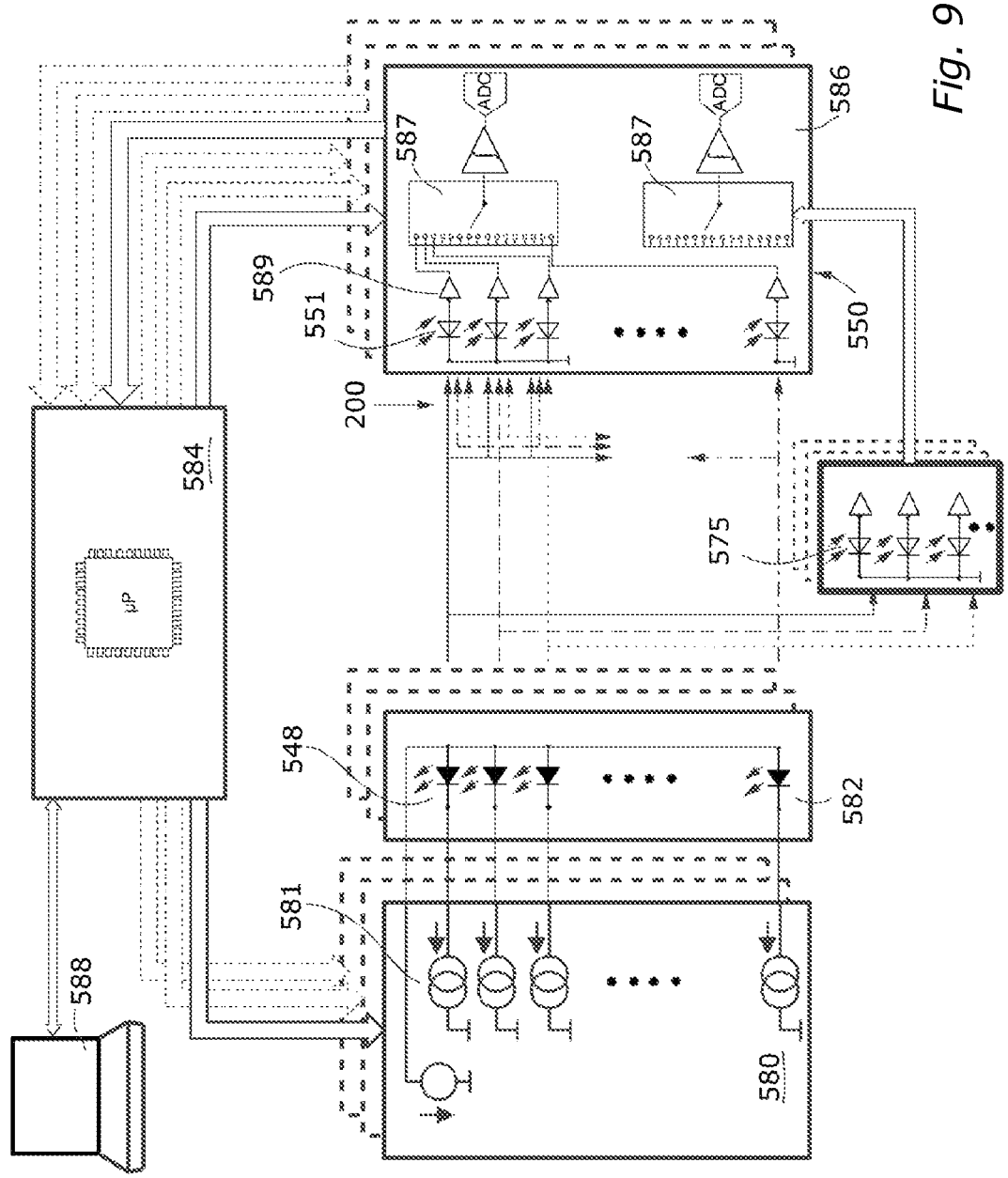
FIG. 9 shows a block diagram regarding the electronic actuation of the optical measurement unit according to FIG. 7a, FIG. 10a shows a first diagram to illustrate a measurement process (modes 1 and 2)

The automatic analyzer 100 according to FIGS. 3 to 5 is equipped with movable and stationary machine components, namely:

- with two pipettors 300a, 300b which are movable in the x-direction along a line of movement defined by the linear cuvette array 200, each of said pipettors being equipped with two pipetting modules 301a1, 301a2 and 301b1, 301b2, the hollow needles 307 of which are designed to be lowerable in the z-direction into the cuvettes 201, into the sample vessels 921 located in the sample store 920 and into the reagent vessels 951a, 951b located in the reagent stores 950a, 950b and which are designed to be movable in the y-direction, substantially normal to the x-direction, between the cuvettes 201 and the sample store 920 and/or the two reagent stores 950a, 950b;
- with a mixer unit (not further shown) for mixing the samples and reagents in the cuvettes 201;
- with a stationary optical measurement unit 500 which, in order to obtain a measurement signal, receives the measurement radiation that exits through a measurement window 203 arranged on the side of the cuvette 201;
- with a cuvette washing unit 600 for cleaning the cuvettes 201, which cuvette washing unit is movable in the x-direction along the line of movement defined by the cuvette array 200,
- with needle washing units 700a1, 700a2, 700b1, 700b2 for cleaning the hollow needles 307 of the pipetting modules 301a1, 301a2, 301b1, 301b2 of the two pipettors 300a, 300b;
- with a stationary temperature control unit 800 for setting a predefinable measurement temperature in the cuvettes 201, and
- with an evaluation and control unit 588, 584 (see FIG. 9)

The pipettors 300a, 300b are attached by means of movable mounting elements (not shown) to the rails 111a, 111b, which are arranged in a parallel manner; in addition, a corresponding rail 113 is provided for mounting the optical measurement unit 500, and a rail 112 together with a movable mount 601 is provided for the cuvette washing unit 600. The movable mounts of the pipettors 300a, 300b and the mount 601 are driven for example by means of toothed belts (not further shown here) and stepper motors at one end of the rails 112, 111a and 111b.

As can be seen in particular in FIG. 4, at least two—in the illustrated example several—of the machine components are designed to be movable in the x-direction independently of one another along or parallel to the line of movement defined by the linear cuvette array 200, and can each access different cuvettes 201 or groups of cuvettes 201 in a freely selectable order.

In the embodiment variant shown in FIGS. 3 to 5, the analyzer 100 has a sample store 920, a first reagent store 950a and a second reagent store 950b. The storage areas may be cooled entirely or in part.

In order to charge the analyzer 100 with sample material, vessels 921 containing analysis samples are introduced manually or by means of robotics into the sample store 920 at predetermined positions. The analyses desired for the individual analysis samples are input into the controller of the analyzer 100.

In order to charge the analyzer with reagents, reagent vessels 951a, 951b containing reagents for analyzing different analytes are introduced manually or by means of robotics into the two reagent stores 950a, 950b of the analyzer 100 at predetermined positions.

Vessels containing calibration liquids and comparative samples may also be introduced into the sample store and/or reagent store.

In the embodiment variant shown, the analyzer shown in FIGS. 3 to 5 has two pipettors 300a, 300b which are movable in the x-direction independently of one another and which—with the exception of the same cuvette—can access individual cuvettes 201 of the cuvette array 200 entirely independently of one another and in a freely selectable order.

Figure 6A:
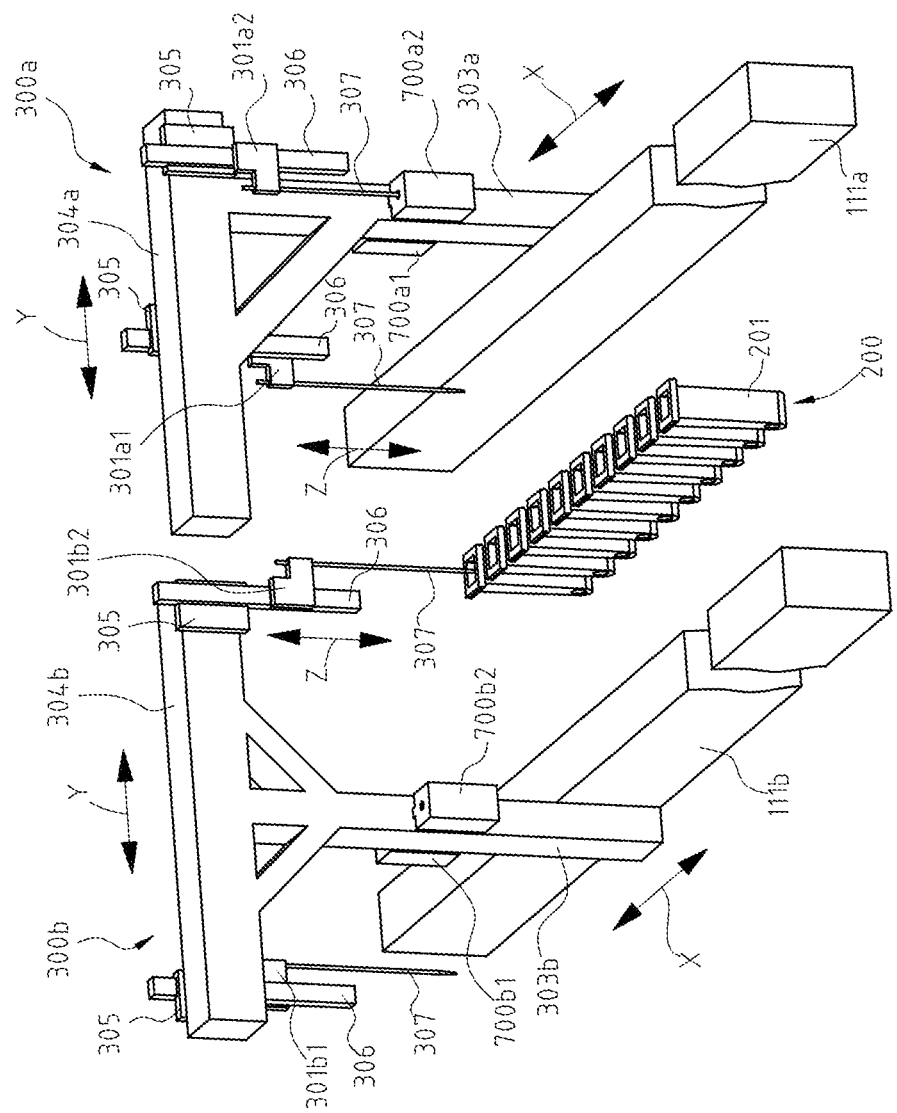
FIG. 6a shows two independently movable pipettors of the automatic analyzer according to FIG. 3, in a three-dimensional view.

The two pipettors 300a, 300b shown in FIG. 6a each have a vertical tower 303a, 303b and also an arm 304a, 304b which is oriented horizontally in the y-direction, so that a substantially L-shaped support structure (pipettor 300a) for the two pipetting modules 301a1, 301a2 or T-shaped support structure (pipettor 300b) for the two pipetting modules 301b1, 301b2 is formed, said support structure being movable in the x-direction along the rail 111a or 111b. Each pipettor thus has two pipetting modules 301a1, 301a2 and 301b1, 301b2, which are movable in the y-direction independently of one another and parallel to one another, along with associated cannulas or hollow needles 307. The pipetting modules 301a1, 301a2 and 301b1, 301b2 are attached to the left and to the right of the arm 304a and 304b by means of a mount 305 which is movable in the y-direction, and thus can move past one another unhindered. Each mount 305 has a downwardly projecting rail portion 306, on which the hollow needle 307 can be lowered in the z-direction into the cuvettes 201 of the cuvette array 200.

The individual pipetting modules 301a1, 301a2 and 301b1, 301b2 each have a needle holder 308 with a region which projects in the direction of the cuvette array 200 and which carries the hollow needle 307. As a result, even when the hollow needle 307 of the pipetting module 301b2 is oriented or lowered in alignment with the cuvette 201, sufficient space remains for the L-shaped pipettor 300a to be able to move past the T-shaped pipettor 300b (see FIG. 4).

In the example shown, the pipettor 300b or the two pipetting modules 301b1, 301b2 thereof can thus access only the sample vessels 921 in the sample store 920 and the reagent vessels 951b in the reagent store 950b, whereas the pipettor 300a or the pipetting modules 301a1, 301a2 thereof only has access to the reagent vessels 951a arranged in the reagent store 950a. All the pipetting modules 301a1, 301a2 and 301b1, 301b2 can be moved as far as the plane of the cuvette array 200 and can be lowered into the individual cuvettes 201.

A significant increase in the sample throughput can be achieved due to the fact that the needle washing units 700a1, 700a2 and 700b1, 700b2 are arranged on the pipettor 300a and 300b and are designed to be movable therewith. In the embodiment variant shown, each pipetting module 301a1, 301a2, 301b1, 301b2 has its own needle washing unit 700a1, 700a2, 700b1, 700b2, which may in each case be arranged for example on the vertical tower 303a and 303b of the pipettor 300a and 300b. Therefore, in each case one of the hollow needles 307 of the pipetting modules 301a1 or 301b1 can be washed in the associated needle washing unit 700a1 or 700b1 while the respective other hollow needle 307 is immersed in a cuvette 201 (see FIG. 6a).

Simple embodiment variants of the analyzer are also conceivable, which have only one pipettor. The latter may be designed either as an L-shaped pipettor 300a which is movable at the side of a sample store or reagent store and may have just one movable pipetting module 301a1, or else may have a T-shaped support structure and be designed to be movable between a sample store and a reagent store.

According to one advantageous embodiment variant of the invention, one individual pipettor 300 may have a base structure 340 which is movable in the x-direction and to which two beams 341, 342 are attached, said beams being oriented parallel to one another and projecting horizontally in the y-direction, and pipetting modules 3011, 3012, which are each independently able to move past one another, are arranged on the mutually facing longitudinal sides of said beams, each pipetting module 3011, 3012 having at least one hollow needle 307 which is lowerable into the individual cuvettes 201.

Such a variant will be explained in greater detail in a pipetting device according to FIG. 6b. The pipettor 300, which is movable in the x-direction, has two pipetting modules 3011, 3012 on a horizontally protruding arm 304, said pipetting modules being movable along a y-direction which is substantially normal to the x-direction. Two beams 341, 342, which are oriented parallel to one another and project horizontally in the y-direction, are attached to a base structure 340 which is movable in the x-direction, and the two pipetting modules 3011, 3012, which are independently able to move past one another, are arranged on the mutually facing longitudinal sides of said beams, each of the pipetting modules 3011, 3012 having at least one hollow needle 307 which is lowerable into the individual vessels 921, 951a, 951b, 201. The two pipetting modules 3011, 3012 are moved in the y-direction by linear drives (for example toothed belt drives), which are not shown here.

The two beams 341, 342 of the pipettor 300 can be connected at the end face of the arm 304 by a connecting web 351 so as to form a substantially rectangular frame structure 343 in order to stiffen the pipettor against deformation in the x-direction. The resulting frame structure can be made even more rigid if stiffening elements 349 are provided on the inner side thereof in each case at the point of intersection between the beam 341 or 342 and the connecting web 351 or the base structure 340 (not shown).

Particularly suitable materials for the arm 304 and the base structure 340 are light metal alloys or fiber composite materials with high tensile strength. The pipettor 300, consisting of the structural features according to the invention, can be manufactured in one or more parts.

Via the base structure 340, which is for example of trapezoidal shape, the arm 304 is suspended on a horizontal running rail 111, which enables the pipettor 300 to move in a longitudinal side of the work surface 114 of a sample and reagent deck 930 that is defined as the x-direction. In the variant shown in FIG. 3b, the arm 304 can be moved by a linear drive, for example a toothed belt drive (not shown), which is connected to a servomotor 347. The running rail 111 is anchored to a solid, vertically oriented back plate 348, which is suitable both as a counterweight during the acceleration and deceleration of the pipettor 300 and also for cooling the running rail 111. In one typical embodiment according to the invention, the back plate 348 may be made of aluminum and may have a weight of 20 kg; the machine frame (not shown in detail) below the work surface 114 may have a weight of >300 kg.

For guiding fluidic lines and any electrical power supply lines and signal lines in the y-direction, the two pipetting modules 3011 and 3012, which are movable on the inner side of the beams 341, 342, have energy chains 3111, 3112 which can be unrolled on the respective beam upper side. For guiding the lines in the x-direction, an energy chain 310 which can be unrolled on the running rail 111 is provided for this purpose.

The pipettor 300 of the pipetting device has a needle washing unit 700, which is movable with the pipettor 300, for washing the respective two hollow needles 307 of the two pipetting modules 3011 and 3012.

The needle washing unit 700 is carried along on a hanging support structure 344 on the pipettor 300, wherein an actuator, for example in the form of a spindle drive acting in the x-direction, makes it possible to change the position of the needle washing unit 700 on the support structure 344 so that the hollow needles 307 of both the pipetting modules 3011 and 3012, which are movable in the y-direction, can be washed using a single needle washing unit 700. In addition, a possibility for changing the x-position of the needle washing unit 700 can also be provided by virtue of suspension on a horizontally pivotable boom of a rotary actuator (not shown). The support structure 344 can be rigidly connected to the arm 304 or to the base structure 340, for example.

A separate energy chain 312 may be provided for guiding fluidic lines and any electrical power supply lines and signal lines of the needle washing unit 700 in the x-direction. However, it is also possible for these lines to be carried along in the unrollable energy chain 310 of the pipettor 300.

According to one embodiment variant, it is also possible for a separate needle washing unit 700 to be provided for each of the two pipetting modules 3011 and 3012, each of said needle washing units being fixedly assigned to one of the pipetting modules 3011 or 3012.

According to another advantageous embodiment variant, a single needle washing unit 700 may be fixedly arranged on the support structure 344 exactly in the middle between the hollow needles 307 of the two pipetting modules 3011 and 3012 that are to be washed, wherein the opening of the needle washing unit 700 may be designed for example as an elongated hole so that the hollow needles 307 of the pipetting modules 3011 and 3012, which are movable on the inner side of the beams 341, 342 at a small distance apart in the x-direction, can be lowered into the opening of the needle washing unit 700 one after the other, or even simultaneously. In this variant, there is advantageously no need for an actuator for moving or pivoting the needle washing unit.

It is advantageous here that, by means of the frame structure, the hollow needles 307 of the two pipetting modules 3011, 3012, which are able to move past one another, are at a minimal spacing from one another in the x-direction of only 2 to 16 mm, preferably 2 to 4 mm, as they move past one another.

Figure 6B:
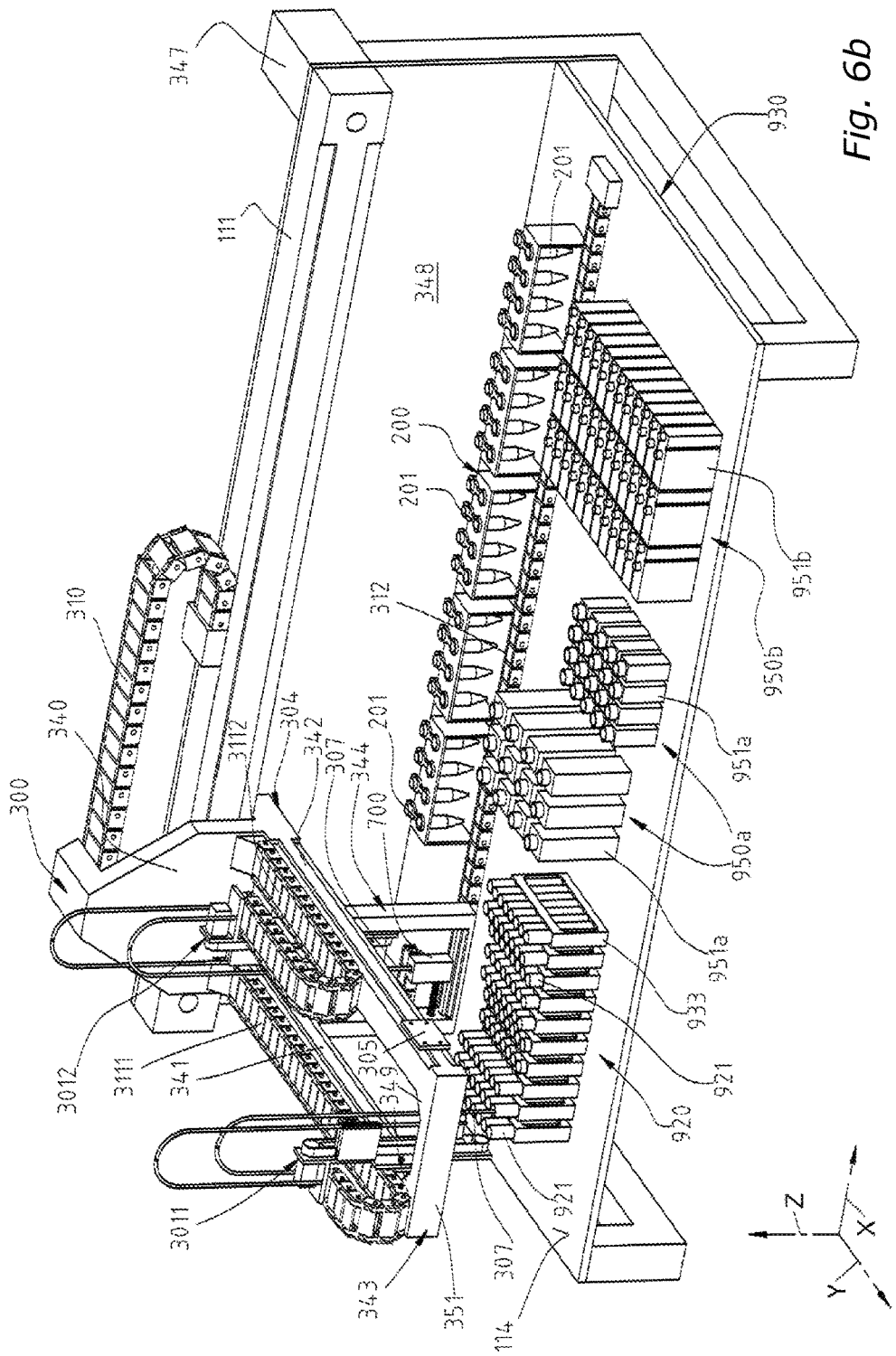
FIG. 6b shows an embodiment variant of a pipetting device with a pipettor, in a three-dimensional view.

The pipettor 300 shown in FIG. 6b may advantageously have, on the outer side of at least one of the beams 341, 342, a mount 305 for attaching a work module (not shown), said mount being movable in the y-direction. The work module may comprise a gripper for transferring or exchanging vessels (for example cuvettes). The movement of the work module may for example be coupled, via a suitable entrainment mechanism, to the movement of a pipetting module 3011 or 3012 moving on the opposite side of the relevant beam 341, 342. The work module may optionally be fixed to the mount 305, or may be moved along with it on a lateral extension (not shown here) of one of the pipetting modules 3011 or 3012. The power supply lines of the gripper can then be carried along very easily on one of the two energy chains 3111 or 3112 together with the power supply lines of the adjacent pipetting module 3011 or 3012.

The gripper of the work module can be used to transfer cuvettes from a cuvette store to an optical measurement unit 500 or to a cuvette disposal container (not shown).

Figure 7A:
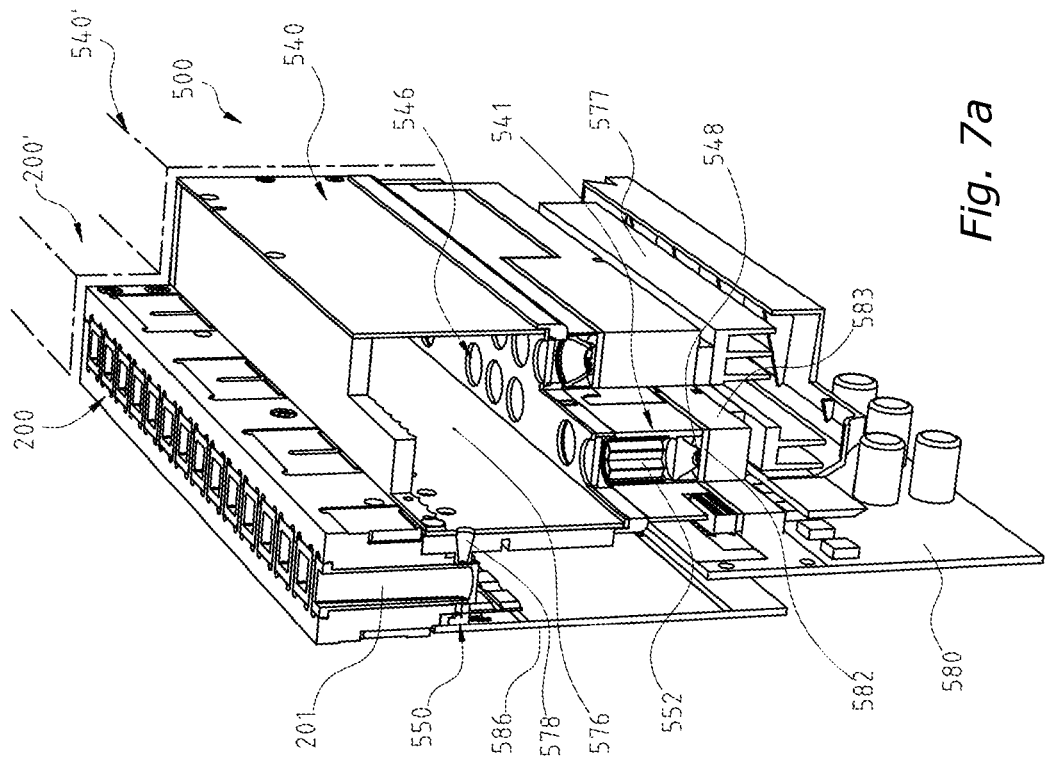
FIG. 7a shows an optical measurement unit, according to the invention, of the analyzer according to FIGS. 3 to 5, in a three-dimensional view, looking toward the light-supplying unit.
Figure 7B:
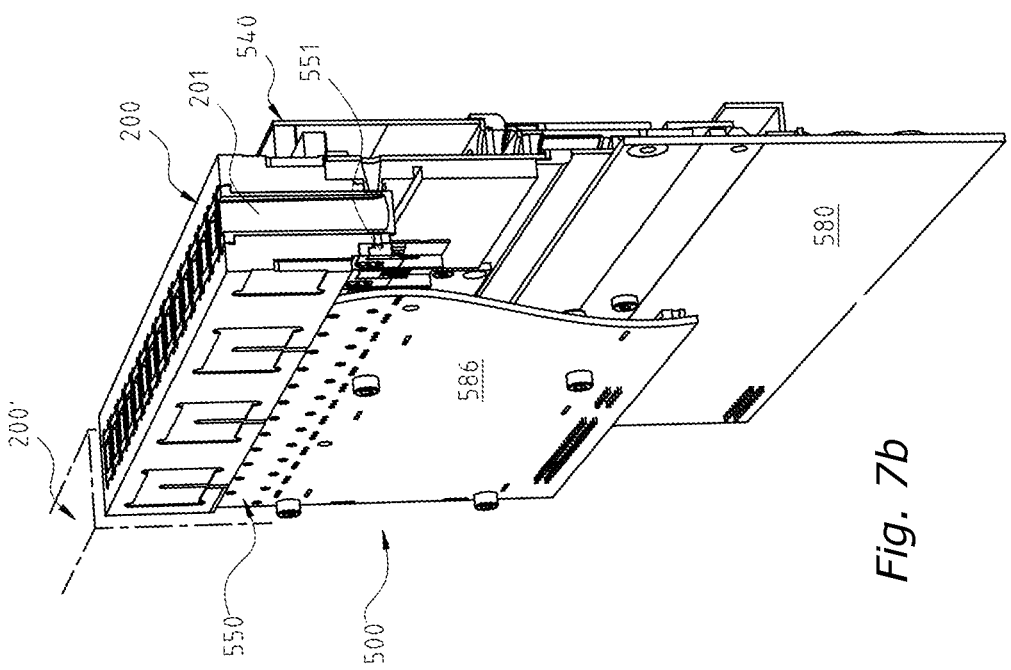
FIG. 7b shows the optical measurement unit according to FIG. 7a in a three-dimensional view, looking toward the detection unit.

The below-described stationary optical measurement unit 500 of the analyzer shown in FIGS. 3 to 5 is used to obtain measurement signals from liquid media which are held in lined-up cuvettes 201 of a stationary (that is to say immovable) cuvette array 200 and comprises, as shown in FIG. 7a and FIG. 7b, the following basic elements:

a light-supplying unit 540 for emitting an inlet radiation into the cuvettes 201 of the cuvette array 200, the light-supplying unit 540 having a plurality of LED light sources 541 which emit in a spectrally different manner in the UV/VIS/NIR wavelength range, and a detection unit 550 for detecting a measurement radiation exiting from the cuvettes 201 of the cuvette array 200 and for converting the measurement radiation into an electrical measurement signal, the detection unit 550 being designed such that at least one photodiode 551 is assigned in a fixed and stationary manner to each cuvette 201 of the cuvette array 200.

The optical measurement unit 500 has at least one stationary light distributor device 542 which distributes the light from the individual LED light sources 541 among the individual cuvettes 201 of the stationary cuvette array 200.

The light distributor device 542 has a cavity formed by walls, the inner surfaces 543, 544, 545 of which, as well as the rear wall and the two end surfaces, are designed to be at least partially mirrored and/or diffusely reflective. The light distributor device 542 has, for each LED light source 541, an inlet opening 546 in the bottom surface 545 for feeding the light into the cavity and has, for each cuvette 201 of the cuvette array 200, an outlet opening 547 for feeding the light into the cuvette 201.

According to the invention, the inner surface 544 at the top of the light distributor device 542 that is located opposite the inlet openings 546 of the LED light sources 541 is designed to be corrugated and reflective, wherein the corrugations of the corrugated inner surface 544 are preferably oriented normal to the longitudinal extension of the light distributor device 542 in order to optimally distribute the light entering from the individual LED light sources 541 in the longitudinal direction of the light distributor device 542 (see FIG. 8b).

In order to ensure that the measurement radiation is applied to the cuvettes 201 as homogeneously as possible, the top part of the inner surface 543 of the light distributor device 542 that is located opposite the outlet openings 547 to the cuvettes 201 is designed to be diffusely reflective (see FIG. 8a). By way of example, barium sulfate ($BaSO_4$) is a suitable material for coating the inner surface 543 in the field of view proceeding from the inlet window 202 of the cuvette 201.

In order to improve the spectral characteristic and to feed the light into the light distributor device 542, at least some LED light sources 541 of the light-supplying unit 540 have optical elements for collimation purposes and a narrowband filter on the output side.

As shown in FIG. 7a and in the detail in FIG. 8a, the LED light source 541 may have an LED 548, arranged in a TIR lens 549, a tubular body 552 for eliminating non-parallel beam components of the LED, and a narrowband filter, preferably an interference filter 553, on the input side into the light distributor device 542.

In this case, the tubular body 552 may have elongate through-openings 570 extending parallel to the longitudinal axis of the LED light source 541, the walls 571 of said through-openings being made of a light-absorbing material or being coated with such a material (see the detail illustration shown in FIG. 8c). Therefore, within a certain tolerance, only rays which are aligned in parallel reach the interference filter 553, since deviating rays are absorbed by the tubular body 552.

One preferred embodiment variant of the LED light sources 541, which are arranged on the bottom surface 545 of the light distributor device 542, is shown in the sectional illustrations according to FIGS. 8e and 8f. In this variant, a converging lens 590 is arranged on the input side of an interference filter 553, which converging lens aligns in parallel the light emitted by an LED 548 for entry into the interference filter 553, wherein a preferably aspherical diverging lens 591 may be arranged on the output side of the interference filter 553 in order to fan out the radiation entering the light distributor device 542.

Preferably, the light rays are fanned out so far (see marginal rays $S_1$, $S_2$ in FIG. 8f) that the inner surfaces of the light distributor device 542 are illuminated as homogeneously as possible. With particular preference, in the case of a rectangular light distributor device 542 as shown in FIGS. 8e and 8f, the surface 544 that is located opposite the bottom surface 545 is illuminated over as large an area as possible, while the lateral surface 543 is not directly illuminated. In the case of a symmetrical diverging lens 591, the light rays exit in the shape of a cone, as a result of which the surface 544 of the light distributor device that is located directly opposite the LED light source 541 is illuminated in a substantially circular manner (see FIG. 8f, second LED light source from the left, marginal rays $S_3$, $S_4$). In order to enable a largely uniform amount of light to exit from each LED light source 541 of the light distributor device 542 in all outlet windows 547, it is advantageous to illuminate the entire surface 544 as homogeneously as possible by means of an aspherical diverging lens 591 (see FIG. 8f, first LED light source from the left, marginal rays $S_1$, $S_2$). The LED light source 541 on the far right in the diagram shown in FIG. 8f has no diverging lens, so that in this case a parallel ray bundle enters the light distributor device 542. In this case, it is advantageous if the surface 544 located directly opposite is designed to be corrugated and possibly mirrored in order to achieve a better light distribution.

For optimal beam guidance between the light distributor device 542 and the individual cuvettes 201 on the one hand and between the cuvettes 201 and the photodiodes 551 of the detection unit 550 on the other hand, according to the invention channel-like feedthroughs 578 are arranged in the wall of the cuvette receptacle 579 on the entry side of the inlet window 202 and on the exit side of the outlet window 203 of each cuvette 201, said feedthroughs having fittings or modifications which serve to eliminate undesired radiation components $U_1$ of the inlet radiation exiting from the light distributor device 542 and undesired radiation components $U_2$ of the measurement radiation exiting from the cuvette 201.

By way of example, according to an embodiment variant shown in FIG. 8i, each of the channel-like feedthroughs 578 in the cuvette receptacle 579 may be designed as a channel 594 having a smooth surface, with a diameter smaller than the length of the bore, and thus can screen out the undesired radiation components $U_1$, $U_2$ on the way to the photodiode 551.

In one preferred variant, as shown in FIG. 8h, the channel-like feedthrough 578 may have a clearance 593 or a cavity, in which the undesired radiation components $U_1$, $U_2$ die out.

According to one particularly advantageous variant, as shown in FIG. 8g, the channel-like feedthroughs 578 may have a fluted or toothed structure 592, at which undesired radiation components $U_1$, $U_2$ that have too great an angle deviation from the radiation axis are blocked or absorbed. This variant can be produced inexpensively in a single component which extends along all the cuvette positions, it being possible for the fluted structure 592 to be realized by means of threaded bores.

The guiding or directing of light in the optical measurement unit takes place in multiple steps in order to meet the requirements:

In the first step, the spatially broadly emitted light from the LEDs 548 is gathered by means of TIR lenses 549 or parabolic mirrors, is parallelized, and is directed toward the interior of the light distributor device 542. Alternatively, as shown in FIG. 8e, the LED 548 may also be arranged at the focal point of the converging lens 590, which aligns the light from the LED 548 in as parallel a manner as possible.

In the (optional) second step, when using a TIR lens, components of the light that have not been sufficiently parallelized are prevented from proceeding further by means of the tubular body 552 or other tube-like elements.

In the third step, optical bandpass filters, for example interference filters 553, are provided in order to obtain a predefined, narrowband, monochromatic light. A diverging lens 591 may optionally be arranged downstream of the interference filter 553 in order to suitably fan out the radiation exiting from the interference filter 553.

In the fourth step, in the interior of the light distributor device 542, the light generated by the individual LED light sources 541 is distributed as homogeneously as possible and is directed into the individual cuvettes 201. To this end, the substantially cuboidal light distributor device 542 is designed such that a diffusely reflective surface 543 is arranged opposite the outlet openings 547 and, with the exception of the inlet and outlet openings, the rest of the inner surfaces are designed to be diffusely reflective and/or mirrored. Preferably, the top surface has a corrugated structure 544 (see FIG. 8b), while the other inner surfaces are preferably flat, so that light over a spectral range from approximately 340 nm to 800 nm is scattered or reflected as effectively as possible. Arranged in the rear wall of the light distributor device 542 are the outlet openings 547, through which the light can pass directly to the inlet windows 202 of the cuvettes 201.

In the fifth step, a ray bundle that is directed into the interior of the cuvette 201 is created by a feedthrough 578, optionally with the interposition of a diaphragm between the light distributor device 542 and the cuvette 201.

In the sixth step, the measurement radiation is directed from the outlet window 203 of the cuvette 201 toward the photodiode 551 of the detection unit 550, optionally with the interposition of a diaphragm.

According to the invention, monitoring or reference detectors 575 are arranged on the light distributor device 542 on the outlet side of through-openings or pinhole diaphragms 576 arranged in a wall, for example in the rear wall, of the light distributor device 542, by which monitoring or reference detectors it is possible to detect fluctuations of the measurement radiation at any time. A pinhole diaphragm 576 together with a reference detector 575 may be assigned to each cuvette 201. If each cuvette 201 is assigned a reference photodiode, these are preferably located at the outlet openings 547 of the light distributor device 542. It is also possible to provide in the light distributor device 542 only two or three pinhole diaphragms 576 together with reference detectors 575.

As shown in FIGS. 7a/b, the stationary cuvette array 200 may be segmented or divided into multiple sections, wherein a separate light distributor device 542 is fixedly assigned to each segment 210.

Each segment 210 is assigned a common light distributor device 542 which extends over the entire length of the segment and which has more than 20 installation positions for LED light sources 541 for up to, for example, 16 optical channels with light of different wavelengths ($\lambda 1$ to $\lambda 16$). The individual LEDs of the LED light sources 541 may preferably be arranged in the form of an LED array on a common printed circuit board 582, for example made of aluminum. In order to increase the intensity, adjacent installation positions may be fitted with LED light sources of the same wavelength. In the region of the front inlet window 202 of each cuvette 201, which is adjacent to the light distributor device 542, the light distributor device 542 has a circular opening, the so-called outlet opening 547, through which the light generated by the LEDs is irradiated through the inlet window 202 into the interior of the cuvette 201. The feedthrough 578 in the cuvette receptacle 579, between the outlet opening 547 and the inlet window 202 in the cuvette 201, may also be funnel-shaped, as shown in FIG. 8d, and may optionally contain diaphragms.

The optical feedthroughs 578 in the cuvette receptacle 579 may thus be designed, independently of one another and on both sides of the inlet window 202 and outlet window 203 of the cuvette 201, in a funnel-shaped manner (FIG. 8d), as a channel 594 with a smooth surface (FIG. 8i), with a fluted or toothed structure 592 (FIG. 8g), or with a cavity or clearance 593 located in the channel (FIG. 8h).

As shown in FIG. 8e, different structures (radial clearance 593 on the inlet side of the cuvette 201 and fluted structure 592 on the outlet side of the cuvette 201) may also be combined in a cuvette receptacle 579 in order to eliminate undesired scattered radiation.

Preferably, the walls of the channel-like feedthroughs 578 in the cuvette receptacle 579 are made of a light-absorbing material or are coated with such a material.

By distributing the light within the light distributor device 542 by multiple scatterings and reflections on the inner walls, the light from each optical channel of the LED light sources 541 passes through the circular outlet openings 547 into the inlet window 202 of each associated cuvette 201.

The intensity I of the light transmitted through the cuvettes 201 is measured by means of a stationary array of photodiodes 551 (at least one photodiode per cuvette), which are each placed fixedly behind the rear outlet window 203 of the cuvettes 201, said outlet windows being remote from the light distributor device 542.

Optionally, a second photodiode may be arranged on each cuvette 201 at an angle rotated through, for example, 90° from the continuous beam path, in order to carry out nephelometric scattered light measurements.

To ensure a constant ambient temperature of the LED light sources 541, a solid aluminum block 583, which is temperature-controlled (possibility of cooling and heating) for example by means of Peltier components, is mounted on the printed circuit board 582 of the LED light sources 541.

The electronics for the optical measurement unit 500, which are shown schematically in FIG. 9, consist of a plurality of circuit units which are distributed on a plurality of printed circuit boards and which are geometrically placed on the stationary cuvette array 200 (see arrow) according to their function.

In the example shown, the printed circuit board of the transmitting unit 580 contains 16 parallel current sources 581, which are each assigned to a particular light source (LED 548) with a specific wavelength. The current sources 581 may be regulated in terms of current strength and in terms of pulse length by an optical controller (584), so that a desired current pulse in terms of length and strength can be set for the light pulse. The LED power supply voltage can also be individually regulated for each LED channel. For temperature control purposes, the circuit board of the transmitting unit 580 is screwed to an aluminum block 583 having cooling fins 577 (see FIG. 7*a*) and is regulated by means of Peltier elements to a settable temperature, for example between 29° C. and 41° C. The thermal drift of the current sources 581 can thus be reduced to a minimum. The power loss occurring in the current sources 581 is evened out by the temporally successive actuation. Always only one current source 581 is activated per unit of time, and thus also always only light with a particular, predefined wavelength is generated.

The actual light sources are realized on a separate, cooled aluminum printed circuit board 582 by means of 16 selected LEDs 548 with the desired 16 wavelengths. The aluminum printed circuit board 582 is used on account of the better thermal coupling of the LEDs, is screwed to the aluminum block 583, and thus is also operated at a constant temperature (for example +37° C.). Despite different pulse lengths, the LEDs have a constant average temperature and thus also generate a low spectral shift.

The aluminum printed circuit board 582 having the LEDs is arranged directly on the light distributor device 542 (see FIG. 7*a*) in order to guarantee the best possible coupling of light into the light distributor device 542. The light from the LEDs 548 is first aligned in parallel via TIR lenses 549 and tubular bodies 552, then is spectrally filtered via optical filters 553, and then is diffusely distributed as uniformly as possible in the interior of the light distributor device 542 so that the light can be coupled out to the 16 cuvettes 201 of the stationary cuvette array at 16 adjacent outlet openings 547 (see arrow 200 in FIG. 9).

A further printed circuit board 585 is equipped with up to 16 monitoring or reference photodiodes 575, which detect the light generated by the LEDs 548 before it passes through the respective cuvette. However, use may also be made of just two global monitoring or reference photodiodes 575. In this case, the light is measured not directly in front of each cuvette but rather at multiple suitable points of the light distributor device 542. Due to the constant geometric conditions, the light in front of each cuvette can be calculated with the aid of a geometry factor.

The printed circuit board 586 of the detector unit 550 is located on the outlet side of the cuvettes of the cuvette array 200. This printed circuit board contains 16 photodiodes 551 for the transmitted light exiting from the cuvettes 201. For each cuvette, the detector unit processes two analog values of the two associated photodiodes 551, 575 for transmitted light and monitoring or reference light. For the scattered light measurement (nephelometry), a third analog value can be detected from each cuvette by a photodiode arranged at the side, but the signal path thereof is not shown in FIG. 9 for reasons of clarity.

The two signal paths starting from the photodiodes 551, 575 are synchronously processed by two 16:1 multiplexers 587, inverters, integrators and ADCs, and are converted into a digital measured value. The multiplexers 587 make it possible to select the for example 16 cuvette channels and to switch between these in temporal succession in a configurable order.

If the stationary cuvette array 200 is segmented, and if a separate light distributor device 542 is fixedly assigned to each segment 210 (see FIG. 7*a/b*), additional printed circuit boards are used for the transmitting unit 580, the printed circuit board for the LEDs 582, the printed circuit board for the monitoring or reference diodes 575 and optionally the printed circuit board for the detector unit 586, said printed circuit boards being indicated in dashed line. By way of example, if 96 cuvettes 201 are arranged in the stationary cuvette array 200, six separate light distributor devices 542 may be provided, each having 16 outlet openings to the fixedly assigned cuvettes 201.

The central printed circuit board 584 for the optical measurement unit 500 is equipped with the optical controller. The optical control unit is realized by a programmable logic (FPGA) as a state machine and can at the same time operate the transmitting unit 580 and the detector unit 586. In order to generate the correct time sequence, the individual light measurements are broken down into light and dark measurements and can be parameterized differently line by line in a configuration memory. The state machine works through these configuration lines in sequence, it also being possible for lines to be skipped. The distinction between light and dark measurements is defined by a flag in the configuration line, as is the desired cuvette channel and the light source. The configuration line also contains the desired delay settings, current strength and pulse length, and also the choice of reference photodiode, LED power supply voltage, oversampling and averaging settings and the period duration.

The detector unit 586 is actuated in a manner synchronized with the transmitting unit 580 and can be set by global parameters with averaging or oversampling settings. The desired integration time, by which the light signal is to be integrated, is also read out from the configuration line. The delay time for the integrator and the integration slope can also be selected here by means of global parameters, so that the settling times of the measurement signal and the integration speed can thus be switched over.

The analog measured value is thus selected from the corresponding photodiode 551 with transimpedance amplifier via the multiplexer 587 and is measured by means of an inverter and an integrator and an optional logarithmic amplifier and is digitized by a high-resolution ADC measurement with or without oversampling. Finally, if a scattered light measurement also takes place, three analog measured values (transmitted light, monitoring or reference light, scattered light) are digitized simultaneously by three ADCs and are stored line by line in the internal memory as raw measured values. It is essential that the measurement of transmitted light and monitoring or reference light and optionally scattered light takes place simultaneously.

The internal memory contains all the raw data and is cyclically read by the evaluation processor by means of software and is converted by a conversion algorithm into a final measured value. The conversion takes into account the dark value and the light value and also the $I_0$ measurement and the $I_1$ measurement before and after the reagents have been admixed. The change in the measured values over time can also be detected through successive measurements. It is essential that the measurements take place periodically and give rise to a repeatable measurement cycle according to the set period duration.

For each cuvette, the calculated data are packed into defined data packets and are transmitted to the main computer 588 by means of a local Ethernet interface. By virtue of this data reduction, it is possible to process and to transfer to the main computer 588 all the cuvettes of the cuvette array 200 of the optical measurement unit 500.

In the measurement method, it is possible to measure I or $I_0$ in rapid succession for each cuvette with a high sampling frequency (>1 Hz). There are various possibilities for actuating and reading the multiple LED light sources 541 and photodiodes 551 of the detection unit 500.

The periodic actuation signal for the individual LED light sources 541 is defined, with regard to the pulse duration and integration duration and also the current level used, for each combination of cuvette and wavelength for the measurement mode used and is not changed during operation.

In the example shown, the actuation of 16 LED light sources 541 takes place via 16 separate current sources 581 and the associated hardware. The exposure of each cuvette to each spectral channel of the LED light sources 541 and the integration times used are individually defined (16×16 combinations). The individual LEDs (or in some positions also multiple LEDs in order to increase the intensity) each sequentially emit one light pulse in the course of one measurement cycle, said light pulse being reflected multiple times on the inner walls in the interior of the light distributor device 542 and finally reaching the 16 associated cuvettes 201 through the 16 outlet openings 547 (see FIG. 8a).

Various measurement modes are provided:
Mode 1: Detection of the dynamic flashing LED signal with constant integration time and variable current strength and pulse duration (256 flashes)
Mode 2: Detection of the static LED signal with variable integration time (256 LED actuations) and variable current strength
Mode 3: Detection of the static LED signal with variable integration time (16 LED actuations)

The measurement takes place individually for each combination of cuvette and wavelength, one light pulse being generated for each measurement point in modes 1 and 2.

Figure 10B:
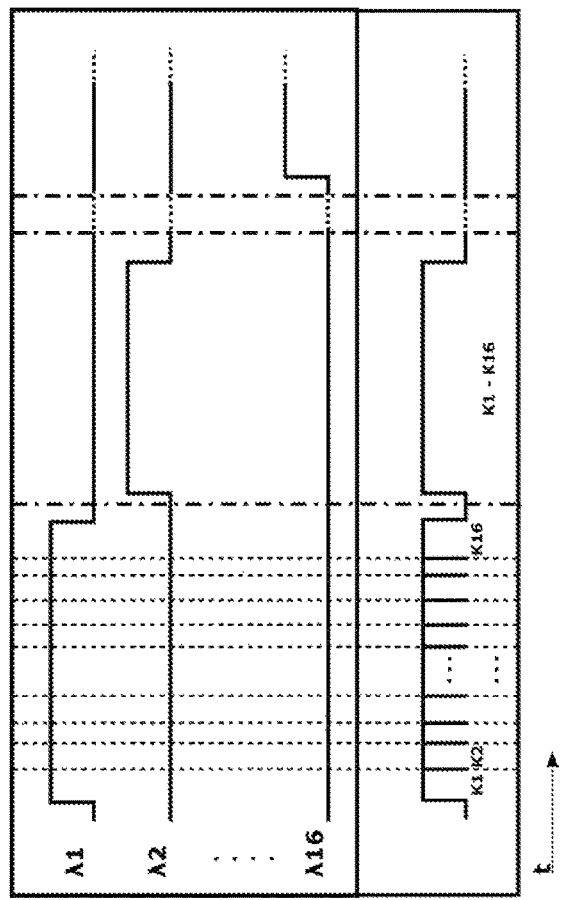
FIG. 10b shows a second diagram to illustrate a measurement process (mode 3)
Figure 10A:
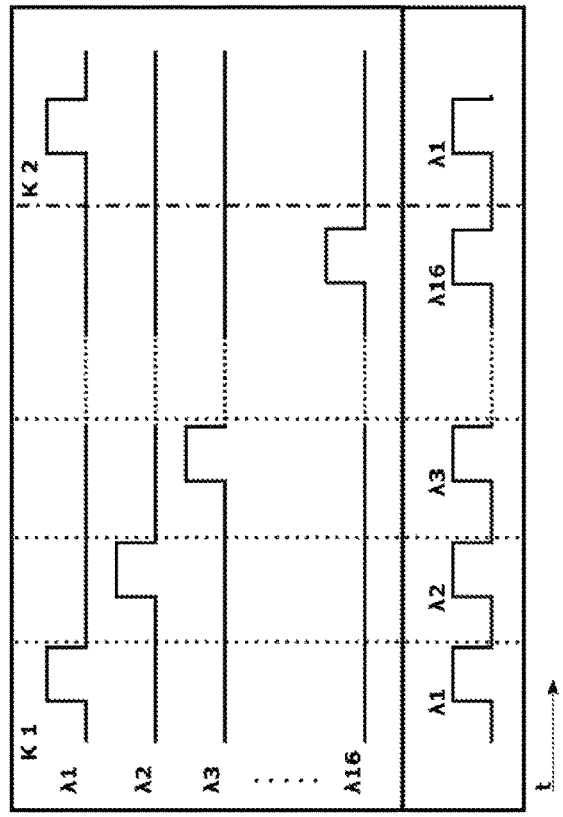

As shown in FIG. 10a, the spectral channels ($\lambda 1 \ldots \lambda 16$) of the individual LED light sources 541 are activated and deactivated in a set order in modes 1 and 2. The resulting light flashes are detected and measured by the photodiode 551 selected by the multiplexer 587. After running through all the spectral channels, the sensors are changed over from the cuvette position K1 to the cuvette position K2 and the light flashes required for the latter are generated in the same order. After fully running through all 16 cuvette positions (that is to say 16×16 light flashes), one sampling is complete and the next one can be initiated. By virtue of this process, up to four samplings per second can be achieved. In modes 1 and 2, alternating dark and light measurements are carried out one after the other, so that in total 512 individual measurements are carried out per sampling.

The measurement method according to modes 1 and 2 is thus characterized in that the spectral channels $\lambda 1 \ldots \lambda n$ of the individual LED light sources 541 are activated and deactivated in a predefined order, wherein in each case the photodiode 551 arranged in a first cuvette position K1 is detected, and in that, after running through all the spectral channels in the first cuvette position K1, a changeover to the next cuvette position K2 takes place. The time duration for one cycle in measurement mode 1 or 2 is >=0.25 seconds.

In measurement mode 3, which is shown schematically in FIG. 10b, the LED light sources 541 are switched in a different order than in mode 1 or 2.

Each LED light source 541 or each spectral channel is switched on only once in the cycle (indicated by the dash-dotted line), and thereafter all 16 cuvettes are measured one after the other, with no dark measurement taking place between these individual measurements. The first cuvette K1 is measured with a delay, so that the associated photodiodes 551 of the detector unit 550 have sufficient time to settle. The other cuvettes K2 to K16 can be measured more rapidly in succession without any additional settling time.

Within one cycle, each LED is switched on only once, with all 16 cuvettes being measured in each case. If a dark measurement is necessary, a dark value is measured once, for example at the start or end of the cycle for measuring the 16 cuvettes.

In the case of 16 wavelengths or 16 spectral channels ($\lambda 1 \ldots \lambda 16$) and 16 cuvette positions, 16×16 light measurements are required. If the 16 dark measurements (once per cycle) are added, this results in 272 individual measurements. The time duration for one cycle in measurement mode 3 is >=0.5 seconds.

The measurement method according to mode 3 is characterized in that the spectral channel $\lambda 1$ of the first LED light sources 541 is activated, with the photodiodes 551 arranged in the cuvette positions K1 . . . Km being detected in a predefined order, wherein, after running through all the cuvette positions K1 . . . Km, the next spectral channel $\lambda 2$ of the next LED light sources 541 is activated.

Advantage of mode 3:
Mode 3 is on the whole faster than the 512 dark/light measurements carried out in an alternating manner in mode 1 and mode 2, because overall fewer measurements and fewer settling times are required for the photodiodes.
The settling time of the photodiodes need only be taken into account prior to the first light measurement of the cuvette K1; the remaining 15 cuvettes K2 to K16 can follow immediately thereafter.
On the whole, therefore, much shorter sampling times per cycle are achieved compared to mode 1 or 2.

In order to mix the samples and reagents, a mixer unit is assigned to the cuvette array 200 as a whole, preferably to individual groups of cuvettes 201. The mixer unit may be realized for example by a pipetting needle or hollow needle which can be set in rotation or vibration and which can be lowered into the respective cuvettes in order to mix the samples and reagents. The mixer unit could also be realized by a stirring mechanism according to WO 99/046601 A1, which was cited in the introduction.

The cuvette washing unit, described in greater detail below, may also have a stirring element which can be lowered into the respective cuvettes in order to mix the samples and reagents.

Figure 11:
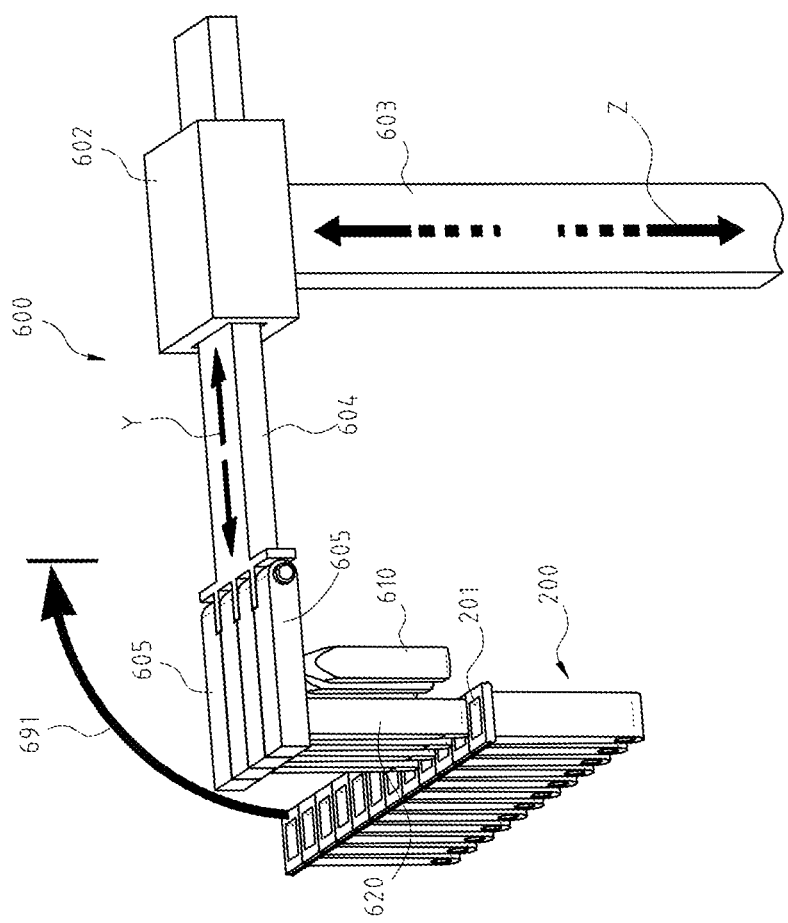
FIG. 11 shows a movable cuvette washing unit of the automatic analyzer according to FIG. 3, in a three-dimensional view.

The cuvette washing unit 600 shown in FIG. 11 is designed to be movable in the x-direction along the rail 112 (see FIG. 4) via a mount 601. The head 602 of the unit 600 can be moved up and down in the z-direction by means of a vertically oriented rail portion 603, which is guided in the mount 601, in order to introduce either the washing elements 610 or the drying plungers 620 into the cuvettes 201 of the cuvette array 200. By way of an adjusting element 604, which is guided in the head 602 and carries for example four drying plungers 620 and also washing elements 610, a changeover from the washing position to the drying position can take place by a displacement in the y-direction. Individual fingers 605, which carry the washing elements 610 and the drying plungers 620, can be pivoted upward—as indicated by the arrow 691—so that only one or a few cuvettes 201 are washed simultaneously.

Figure 12:
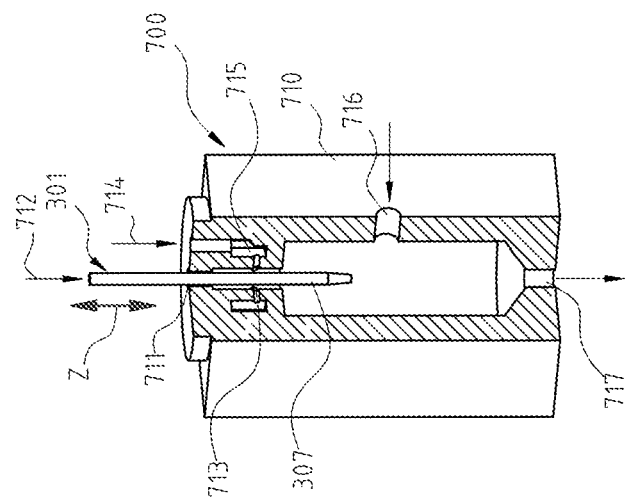
FIG. 12 shows a needle washing unit of the automatic analyzer according to FIG. 3, in a three-dimensional, partially cut-away view.

FIG. 12 shows, in an enlarged sectional illustration, the structure of a needle washing unit which is denoted by the general reference sign 700 and which corresponds to the substantially identically constructed needle washing units 700, 700a1, 700a2, 700b1, 700b2 shown at different positions in FIGS. 3 to 5 and 6a and 6b, and a pipetting module together with a hollow needle 307, said pipetting module being denoted by the general reference sign 301 and corresponding to the substantially identically constructed pipetting modules 3011, 3012, 301a1, 301a2, 301b1, 301b2 shown at different positions in FIGS. 3 to 5 and 6a and 6b. The hollow needle 307 of the pipetting module 301 is introduced through a receiving opening 711 in the housing 710 of a needle washing unit 700, wherein simultaneously the lumen of the hollow needle 307 can be cleaned with a system liquid 712 and the outer side of the needle can be cleaned with a rinsing liquid 714 which is supplied from an annular chamber 715 via lateral cleaning nozzles 713. In order to clean the inside and the outside of the hollow needle 307 by repeatedly aspirating and discharging washing solution from the lower part of the needle washing unit 700, washing solution can be supplied through a radial inlet 716 and can then be emptied through an extraction opening 717.

Figure 13:
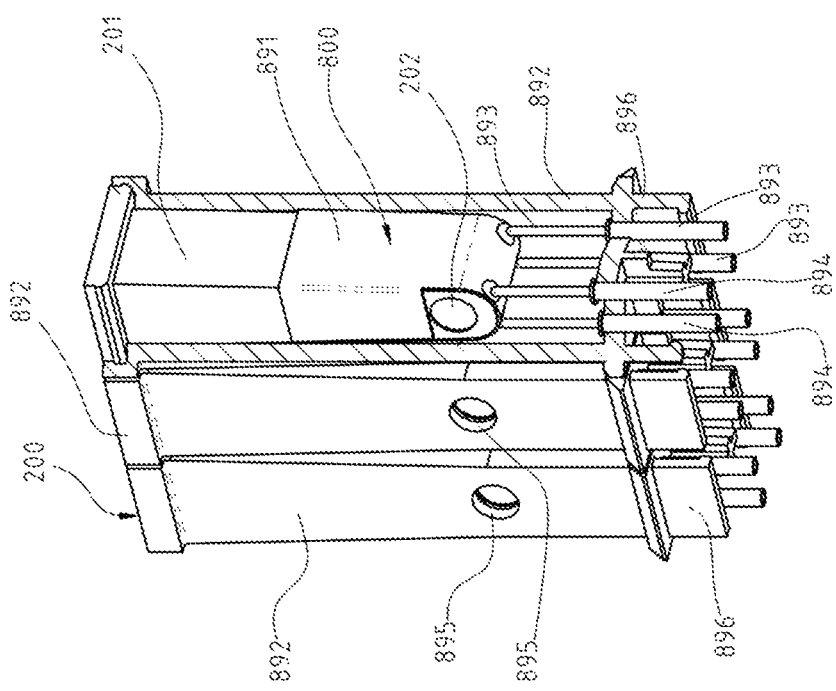
FIG. 13 shows a temperature control unit for the cuvettes of the automatic analyzer according to FIG. 3, in a three-dimensional, partially cut-away view.

FIG. 13 shows an enlarged detail of the linear cuvette array 200 of the analyzer 100 with the partially cut-away housing 892 and a cuvette 201 arranged therein, said cuvette being contacted by a heating foil 891 of a temperature control unit 800 in order to set a predefinable measurement temperature; the electrical contact pins 893 of said temperature control unit emerge from the housing 892. Further electrical contact pins 894 may be provided for contacting a temperature sensor. The cuvette 201 has measurement windows on the side, in the illustrated example inlet and outlet windows 202, 203 (outlet window not visible), which are arranged in a region close to the bottom and are preferably arranged plane-parallel to one another, said measurement windows being transparent to the inlet radiation and the outlet radiation or measurement radiation of the optical measurement unit 500. In the region of the inlet and outlet windows 202, 203 of the cuvette 201, the housing 892 has corresponding openings 895. The individual contact pins 893, 894 latch into corresponding contact openings. Latching elements 896 are integrally formed at the bottom of the housing 892, which latching elements latch into a support element in order to attach the cuvette array 200.

Figure 14:
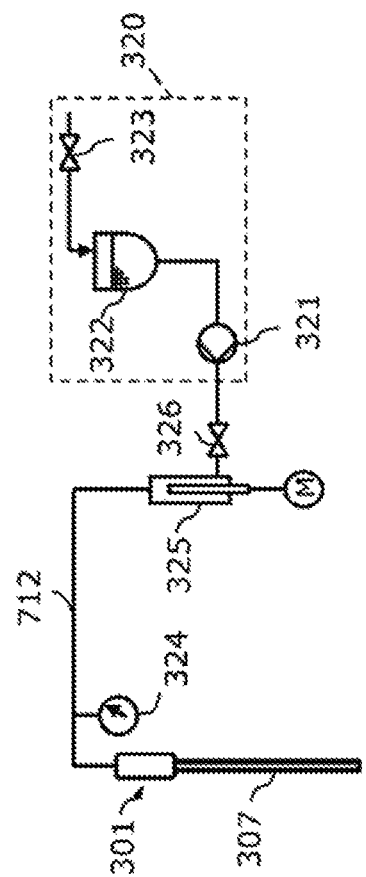
FIG. 14 shows fluidic elements of a hollow needle or pipetting needle of a pipetting module according to FIG. 6a, in a schematic illustration.

FIG. 14 shows the fluidic circuit diagram of a pipetting module 301, the hollow needle 307 of which is connected, via a pressure transfer channel 712 which is filled with a degassed liquid, to a precision piston pump 325, preferably a positive displacement pump (diluter) which is driven by a stepper motor. The positive displacement pump has on the side an additional liquid connection which is connected via a solenoid valve 326 to a supply unit 320 for a system liquid, which conveys for example degassed, deionized water via a rinsing pump 321 from a storage vessel 322, which can be refilled or pressurized via a solenoid valve 323.

In order to detect faults, the pressure transfer channel 712 has, in the vicinity of the pipetting module 301, a further connection to a pressure sensor 324, which is connected to an evaluation and control unit (not shown here), for example in order to detect blockages of the hollow needle 307.

Description of a Pipetting Process

In order to transfer a defined quantity of liquid using the pipetting module 301, the latter is first moved in the horizontal direction to a first vessel, 5 µl of air (spacer) is aspirated into the tip of the hollow needle 307, and the hollow needle 307 is lowered in the direction of the liquid surface of the first vessel. In order to ensure a sufficient, but not excessive, depth of immersion of the hollow needle 307, the downward movement of the hollow needle 307 is stopped at a defined depth of immersion by a signal from a liquid surface detection device (not shown), for example using a capacitive detection principle. In order to aspirate a defined quantity of liquid with high accuracy in the µl range, a negative pressure is then generated in the hollow needle 307 of the pipetting module 301 by moving the working piston of the positive displacement pump (diluter) shown in FIG. 14 in the downward direction, which causes a corresponding volume of liquid to be aspirated from a first vessel. The hollow needle 307 is then moved together with the aspirated liquid, which is separated from the system liquid by a separating air bubble (spacer), to a second vessel, wherein the process then takes place in reverse and the aspirated liquid is dispensed through the tip of the hollow needle 307 into the second vessel. At least between two pipetting processes involving different liquids to be pipetted, an internal and external cleaning of the hollow needle 301 always takes place in a needle washing unit 700 (see FIG. 12).

Figure 15:
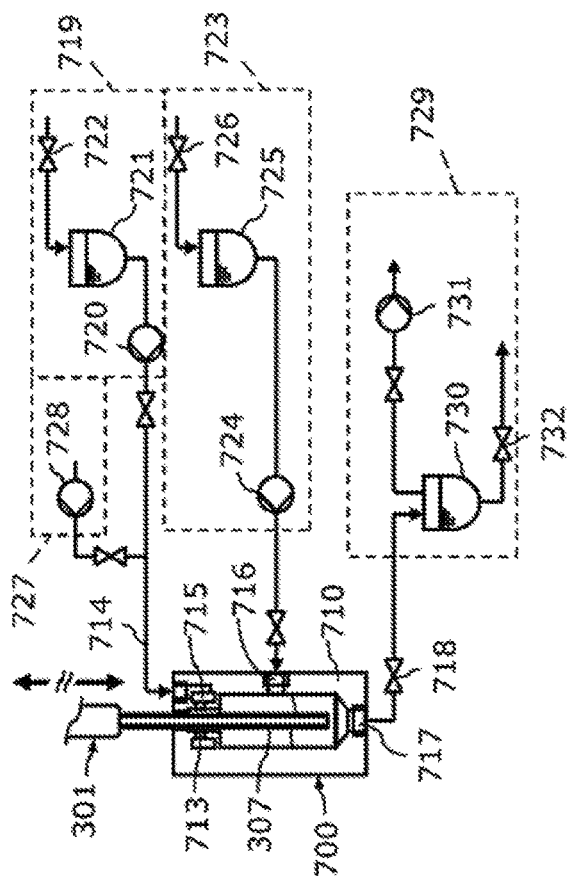
FIG. 15 shows fluidic elements of a needle washing unit according to FIG. 12, in a schematic illustration.

FIG. 15 shows the fluidic circuit diagram of a needle washing unit 700 according to FIG. 12, with the hollow needle 307 of the pipetting module 301 lowered therein. The housing 710 of the needle washing unit has in the upper region a concentrically extending annular chamber 715, which acts as a media supply for a plurality of inner, concentrically oriented cleaning nozzles 713 and which is connected via respective solenoid valves to a supply unit 719 for a rinsing liquid (for example deionized water) and a supply unit 727 for dry air.

An inlet 716 arranged radially at mid-height of the housing 710 of the needle washing unit 700 is likewise connected to a solenoid valve and serves solely for supplying surfactant-containing washing solution from a supply unit 723.

The supply units 719 for a rinsing liquid and 723 for a washing solution each have a pump 720, 724 which conveys a surfactant-containing washing solution or a rinsing liquid from the respective storage containers 721, 725, which can each be refilled or pressurized via a solenoid valve 722, 726. The supply unit 727 for air has an air pump 728 for supplying compressed air and optionally a drying means (not shown).

The extraction opening 717 located at the bottom of the needle washing unit 700 is connected via a solenoid valve 718 to the wastewater collection unit 729, which is under a vacuum and substantially consists of a collecting container 730 which has in the gas space above the liquid a connection to a vacuum pump 731, which is connected to the collecting container 730 via a solenoid valve. The wastewater collected can be discharged via a solenoid valve 732 at the bottom of the collecting container 730 and can be fed to a further wastewater treatment.

Description of a Needle Washing Process

In a typical process for washing the hollow needle 307 of the pipetting module 301, the latter is first moved horizontally to the needle washing unit 700 and is lowered into the lower holding position of the washing chamber. All the wastewater that is produced when cleaning the hollow needle 307 is sucked away via the extraction opening 717 located at the bottom, is collected, and is optionally subjected to an aftertreatment. Residual amounts of the last-pipetted liquid which are located in and on the needle tip are then emptied and sucked away via the precision piston pump 325 of the hollow needle 307, which is shown in FIG. 14. Finally, the lowered hollow needle 307 is rinsed from behind by means of the supply unit 320 for system liquid, which is shown in FIG. 14.

In a next step (with the solenoid valve 718 at the extraction opening 717 closed), a defined volume of surfactant-containing washing solution is introduced through the inlet 716 in the housing 710 of the needle washing unit 700, as a result of which the chamber in the lower part fills with a defined level of washing solution. The hollow needle 307 of the pipetting module 301 is lowered so far until an external wetting of the needle can take place by immersion in the washing solution and an internal wetting of the hollow needle 307 can take place as a result of the washing solution being aspirated into the needle interior. The aspirated washing solution is then discharged again, it being possible for the process of aspirating and discharging the washing solution to be repeated multiple times in order to improve the cleaning effect.

In a last step, the contaminated washing solution is sucked away and the interior of the hollow needle 307 is rinsed with system liquid (for example degassed, deionized water), while the outer side of the hollow needle 307 is at the same time rinsed with rinsing liquid from the supply unit 719 by the concentrically arranged cleaning nozzles 713 located at the top, the tip of the hollow needle 307 being moved upward from the bottom in order to improve the cleaning effect.

Once the simultaneous rinsing of the inside and the outside is complete, the hollow needle 307 is moved back into the lower holding position, the media supply to the cleaning nozzles 713 is switched to the supply unit 727 for compressed air, and the tip of the hollow needle 307 again moves upward from the bottom, as a result of which adhering water droplets can quickly be removed from the needle surface. The hollow needle 307 can then be moved out of the needle washing unit 700 and, after aspirating a separating air spacer (5 µl), is again ready for pipetting.

Figure 16:
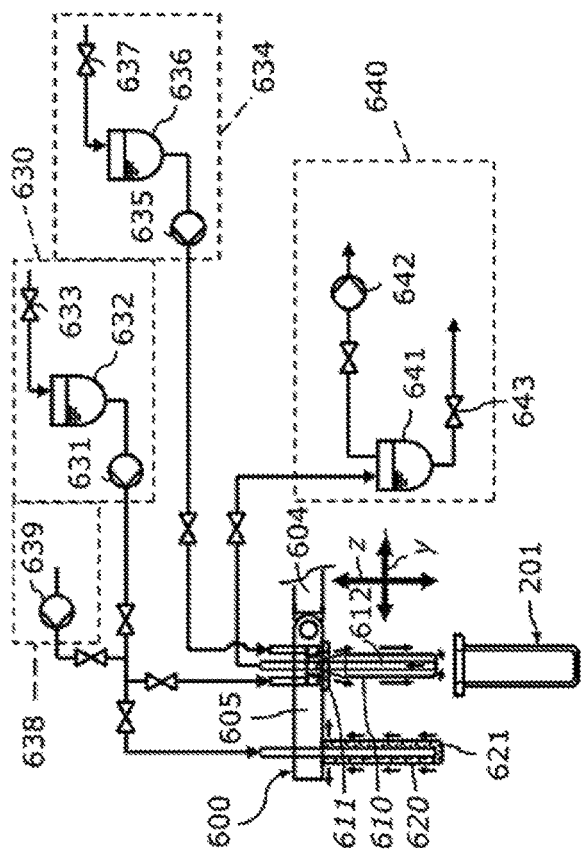
FIG. 16 shows fluidic elements of a cuvette washing unit according to FIG. 11, in a schematic illustration.

FIG. 16 shows the fluidic circuit diagram and the longitudinal section of a finger 605 of the cuvette washing station 600 which is articulated to the adjusting element 604, together with a washing element 610 and a drying plunger 620 (see also FIG. 9), it being possible for the descriptions of the supply units 630 (rinsing liquid), 634 (washing solution) and 638 (air) and also of the wastewater collection unit 640 to be taken from the supply units 719 (rinsing liquid), 723 (washing solution), 727 (air) and 729 (wastewater) in the description of the figures relating to FIG. 13, which are functionally identical and/or structurally identical to the units shown in FIG. 14.

The washing element 610 and also the drying plunger 620 of the finger 605 of the cuvette washing station 600 can be lowered one after the other, by horizontal and vertical translational movements, into the cuvette 201 of a linear cuvette array that is to be washed, wherein, after being lowered into the cuvette 201, in each case a circumferential gap of less than 1 mm remains free between the inner side of the cuvette 201 and the washing element or drying plunger, in order to enable a controlled flow of the cleaning media along the inner cuvette wall.

The washing element 610 has, at its upper end, an elastomer seal 611 which prevents any escape of cleaning media between the upper cuvette rim and the underside of the finger 605 during the washing process. Around the shaft of the riser channel 612, which extends in the middle of the washing element 610 and is designed to suck away the wastewater and waste air, there is an annular media supply which makes it possible to rinse the inner side of the cuvette from top to bottom (see arrows). Via suitable solenoid valves, the washing element 610 can be charged with surfactant-containing washing solution from the supply unit 634, with rinsing liquid (for example deionized water) from the supply unit 630, or with compressed air from the supply unit 638, these being discharged via the vacuum-operated wastewater collection unit 640 by being supplied to the vacuum-operated wastewater collection unit 640 via a solenoid valve. The wastewater collection unit 640 substantially consists of a collecting container 730 which has, in the gas space above the liquid, a connection to a vacuum pump 642, the latter being connected to the collecting container 641 via a solenoid valve. The wastewater collected can be discharged via a solenoid valve 643 at the bottom of the collecting container 641 and can be fed to a further wastewater treatment.

The drying plunger 620 is made of a porous, air-permeable material and has in the interior a longitudinal channel 621 which does not extend quite as far as the bottom and which serves to supply and distribute the compressed air through the wall of the porous drying plunger 620 into the cuvette 201. The drying plunger 620 does not adjoin the underside of the finger 605 with a seal, but rather projects somewhat in the lowered state and forms a circumferential air outlet gap (see horizontal arrows) between the top of the cuvette 201 and the underside of the finger. The drying plunger 620 may be connected via a solenoid valve to compressed air from the supply unit 638.

Description of a Cuvette Washing Process

In a step preparing for the actual cleaning, the washing element 610 is lowered into the cuvette 201 to be washed, and the reagent/sample mixture located in the cuvette 201 after the analysis is sucked away via the central riser channel 612 and is fed to the wastewater collection unit 640.

In a first cleaning step, flushing takes place using washing solution from the supply unit 634, rinsing liquid from the supply unit 630 and finally compressed air from the supply unit 638, it being possible for this cleaning sequence using said media to be repeated multiple times in order to improve the cleaning effect.

The washing element 610 is then lifted out of the washed cuvette 201, which nevertheless contains residual moisture, and the finger is moved in the y-direction.

In a second cleaning step, the drying plunger 620 is then lowered in the z-direction into the cuvette 201 and air is blown along the inner side of the cuvette for a certain period of time using dry compressed air from the supply unit 638, wherein the air required for this exits uniformly from the porous body of the drying plunger 620, sweeps along the inner side of the cuvette 201 from bottom to top, and exits at the shank of the drying plunger 620.

EXAMPLES

The automatic analyzer shown in FIGS. 3 to 5 operates for example as follows:

Prior to an analysis, that is to say prior to determining an analyte $A_x$ of an analysis sample $P_x$, the control unit of the analyzer brings together, from the known and previously input information, all the data required for analyzing the analyte $A_x$ (analysis protocol, positions of the vessels 921, 951a, 951b containing the analysis sample and containing the reagents required for the analysis, position of a free cuvette 201 in the cuvette array 200, cuvette temperature, choice of measurement procedure, calibration data, measurement and evaluation algorithms).

Example: Single Analysis

Phase 1

At the start of and during the analysis, the temperature of the cuvette 201 provided for the analysis is controlled to a predetermined temperature by means of the temperature control unit 800 assigned to the cuvette 201.

A predetermined quantity of a first analysis sample is taken up from a first sample vessel 921 in the sample store 920 by the first pipetting module 301b1 of the T-shaped pipettor 300b, and a predetermined quantity is dispensed by the latter into a free cuvette 201. After the pipetting process, the pipetting module 301b1 is washed in the first needle washing unit 700b1 of the pipettor 300b and is made available.

Phase 2

A predetermined quantity of a first reagent liquid is taken up from a first reagent vessel 951a in the reagent store 950a by a pipetting module 301a1 of the L-shaped pipettor 300a, and a predetermined quantity is pipetted into the cuvette 201. The two liquids in the cuvette are then mixed by switching on the mixer unit 400 assigned to the cuvette for a short period of time (a few seconds). After the pipetting process, the hollow needle 307 of the pipetting module 301a1 is washed in a first needle washing unit 700a1 of the L-shaped pipettor 300a and is made available.

Phase 3

Depending on the respective analysis protocol, a predetermined quantity of a second reagent liquid is taken up from a reagent vessel 951b in the reagent store 950b by the second pipetting module 301b2 of the T-shaped pipettor 300b, and a predetermined quantity is dispensed by the latter into the cuvette 201. The contents of the cuvette are then mixed by switching on a mixer unit 400 assigned to the cuvette 201 for a short period of time (a few seconds). After the pipetting process, the hollow needle 307 of the pipetting module 301b2 is washed in the second needle washing unit 700b2 of the T-shaped pipettor 300b and is made available.

Phase 4

Phase 4 begins with the photometric measurements on the cuvette 201, usually after completion of phase 2.

The stationary optical measurement unit 500 collects the measurement radiation exiting at the outlet windows 203 of the cuvettes 201 and forms a measured value by means of the evaluation electronics (see FIG. 9).

While the chemical reaction takes place in the cuvette 201 between the sample and the reagent, measurement points can be generated at defined time intervals. Depending on the respective analysis protocol, singular or—in the case of kinetic measurements—time-dependent measured values at one or more wavelengths are obtained, and are calculated and displayed with previously known reference values and calibration values assigned to the respective analysis, in order to give a concentration value of the analyte.

Depending on the type of the respective analysis and sample, the measurement process—particularly in the case of kinetic measurements—may extend over very different lengths of time, from a few seconds to the double-digit minute range.

Immediately after completion of the photometric measurement, the cuvette 201 is released in order to be washed by the cuvette washing unit 600. The washing process by means of the cuvette washing unit 600 takes place immediately after the cuvette has been released, preferably together with a plurality of adjacent cuvettes 201 which have likewise been released for washing, and after the movable cuvette washing unit 600 has "become free". After washing and drying, the cuvette 201 is made available for the next analysis.

Example: Multiple Analyses

Prior to carrying out multiple analyses, the sample store 920 is manually or automatically charged with the samples $P_1$ to $P_n$. The type and number of analyses $A_1$ to $A_n$ to be carried out for each sample $P_x$ is input into the controller of the analyzer 100. The reagent stores 950a, 950b are optionally charged or replenished with the reagents required for the analyses to be carried out.

For each analysis $P_xA_x$ to be carried out, the above-described phases 1 to 4 are carried out, in each case starting with phase 1.

Once the pipettor 300b in phases 1 and 3 has been claimed by the analysis $P_xA_x$ to be carried out, phase 1 of the subsequent analyses $P_xA_{x+1}$ or $P_{x+1}A_x$ can begin only when the analysis that is taking place has completed phase 1 and is outside of phase 2, namely for as many subsequent analyses as there are "free" cuvettes, that is to say cuvettes which have not been claimed by other analysis processes.

In contrast to the systems described in the introduction, the concept according to the invention makes it possible that, once a measurement is complete, a cuvette can immediately be washed and made available for a new test, without this disadvantageously interfering with the procedures of the analysis processes that are still ongoing.

Figures 17A, 17B, 17C:
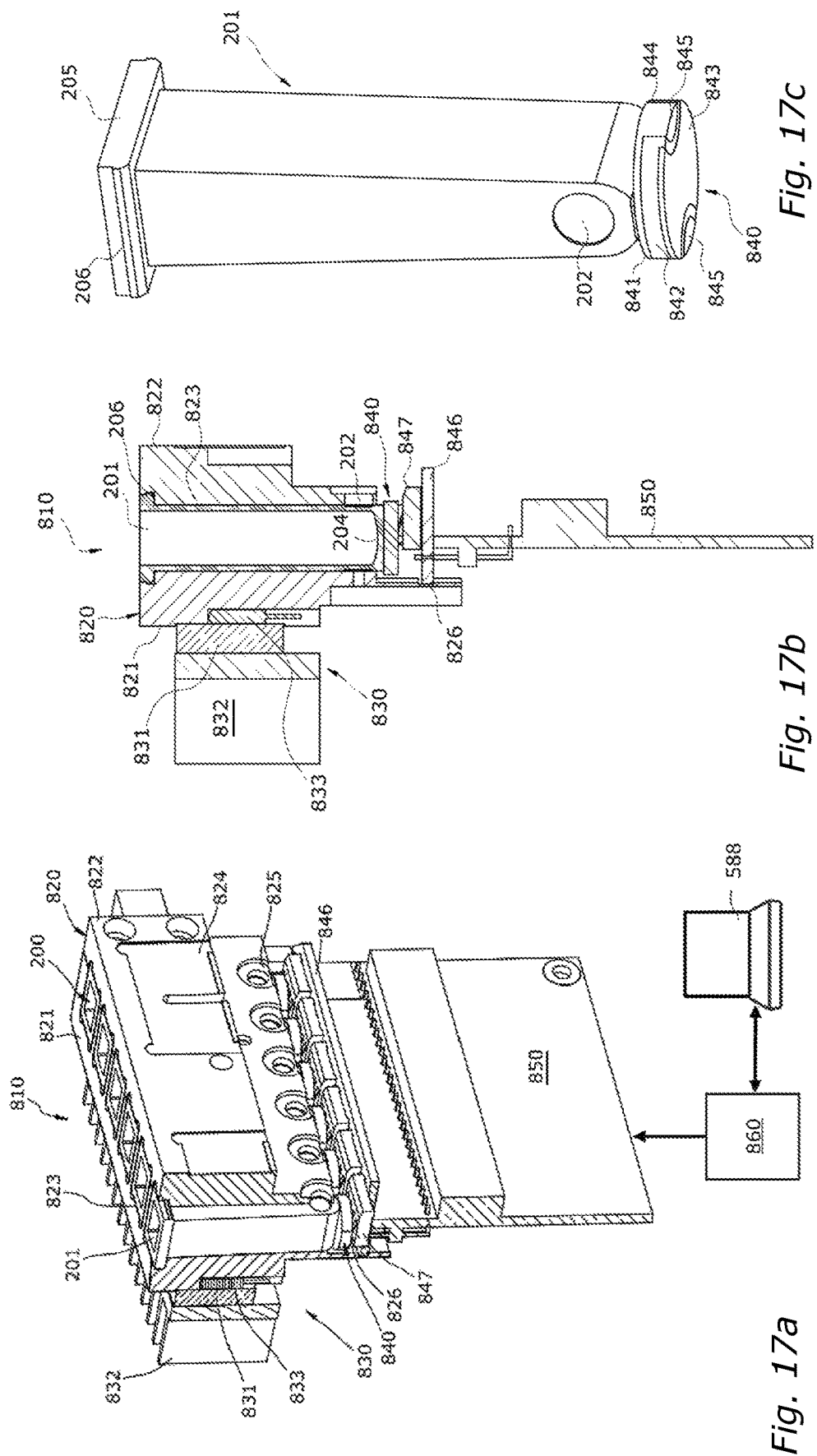
FIG. 17a shows a device for mixing and controlling the temperature of liquid media in an automatic analyzer according to FIGS. 3 to 5, in a three-dimensional view.
FIG. 17b shows the device according to FIG. 17a in a sectional illustration according to FIG. 17a, FIG. 17c shows a cuvette together with an ultrasonic transducer of the device according to the invention as shown in FIG. 17a, in a three-dimensional view.

The combined device 810 shown in FIGS. 17a to 17c for mixing and controlling the temperature of liquid media serves to control the temperature of the liquid media introduced into the lined-up cuvettes 201 of a cuvette array 200. In the illustrated example, this is a linear, stationary cuvette array 200.

The individual cuvettes 201 of the cuvette array 200 are arranged in a temperature-controllable cuvette block 820, for example made of aluminum, which at the same time serves as a cuvette holder. The walls of the funnel-shaped receptacles 823 bear with a form fit against the walls of the cuvettes 201 in order to ensure optimal heat transfer. The cuvette block 820 consists of a base part 821 containing the receptacles 823 and of a front part 822 which can be opened by a lateral pushing movement.

A temperature control device 830 is arranged on the cuvette block 820, for example on the base part 821, said temperature control device having a cooling and heating device, for example in the form of one or more Peltier elements 831 and also cooling fins 832. In order to regulate the temperature of the cuvette block 830, a temperature sensor 833 is arranged in a receptacle between the base part 821 and the Peltier element 831.

On the openable front part 822 of the cuvette block 820, it is possible to see connection surfaces 824, which can also be used to attach a cooling and heating device, for example Peltier elements. The front part 822 additionally has openings 825 corresponding to the measurement windows 202 of the cuvettes 201, in order to enable an optical measurement of the liquid media in the cuvettes 201.

An ultrasonic transducer 840, for example a thickness-mode transducer, is attached to the bottom 204 of each cuvette 201, for example by adhesive bonding or by being injection-molded therewith during manufacture of the cuvette, by which ultrasonic energy can be introduced into the cuvette 201. The ultrasonic energy introduced is used both for mixing the liquid media and also for targeted heating—in addition to the base load resulting from the temperature control by the cuvette block 820.

The ultrasonic transducer 840 is designed as a piezoelectric thickness-mode transducer which—as shown in detail in FIG. 17c—substantially consists of a disk-shaped piezoelectric element 842 and contact electrodes 841 and 843 arranged on both sides. The electrode 841 on the cuvette side is contacted with the lower electrode 843 via lateral contact strips 844 and forms crescent-shaped contact areas 845 at these locations.

For each cuvette 201 and the ultrasonic transducer 840 thereof, a contact block 847 supported by a spring contact board 846 is provided, said contact block having four contact springs 848, two of which contact the crescent-shaped contact surfaces 845 and two of which contact the lower contact electrode 843 of the ultrasonic transducer 840. The cuvette 201 has, at the filling opening 207, a collar 205 and also stop strips 206 on opposite sides, by which the cuvette 201 is held in the cuvette block 820 counter to the pressure of the contact springs 848.

The edge of the spring contact board 846 is inserted in a horizontally extending groove 826 of the cuvette block 820 and is supported against the downwardly projecting decoder board 850, the circuits of which will be explained in greater detail in FIG. 18.

Figure 18:
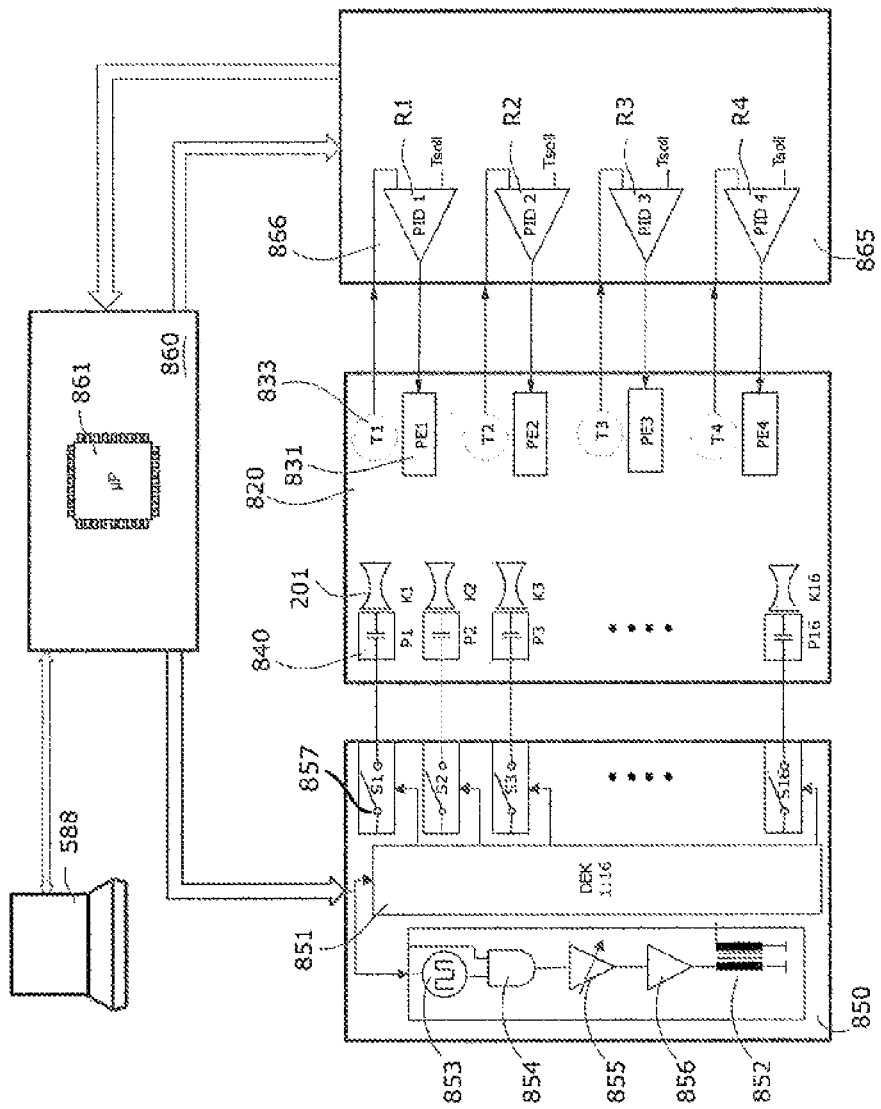
FIG. 18 shows a block diagram regarding the electronic actuation of the device for mixing and controlling the temperature of liquid media according to FIG. 17a FIG. 19a shows a temperature diagram to illustrate a first exemplary embodiment of a temperature control and mixing process for a liquid.

FIG. 18 shows a block diagram regarding the electronic actuation of the device for mixing and controlling the temperature of liquid media according to FIG. 17a, said block diagram comprising the functional blocks personal computer 588, controller board 860, decoder board 850, cuvette block 820, and a temperature control circuit 865.

The controller board 860 has an FPGA (Field Programmable Gate Array) as the processor 861 and serves to control the decoder board 850 and also the temperature control circuit 865. The personal computer 588 may be connected to the controller board 860, for example via an Ethernet interface, and depending on the mixing and temperature control task to be performed in one of the cuvettes 201 of the cuvette block 820 transmits appropriate instructions to run firmware programs on the controller board 860, and also serves for the return transmission of control data, such as the measured temperatures for example, for controlling the temperature of the cuvette block 820.

Cuvettes 201 together with the associated ultrasonic transducers 840 are arranged in the cuvette block 820, respectively at the positions K1 to K16 and P1 to P16, wherein in the example shown, for temperature control purposes, a respective Peltier element 831 together with the associated temperature sensor 833 is provided in the positions PE1 to PE4 and T1 to T4.

The temperature control circuit 865 thus has four temperature control loops 866, each consisting of a Peltier element 831, a temperature sensor 833 and a PID (Proportional, Integral, Derivative) controller R1 to R4, and is connected via an interface to the controller board 860 for data exchange purposes (receiving parameters such as temperature setpoints and sending back measured temperatures from the temperature control circuit 865 to the controller board 860).

The decoder board 850 is likewise connected via an interface to the controller board 860 and receives from the latter control signals for selecting individual ultrasonic transducers 840 via the decoder circuit 851 implemented on the decoder board 850 and the associated optical switches 857 in the positions S1 to S16, as well as control signals for parameterizing the oscillator circuit 852. The oscillator circuit 852 receives control signals for adapting the frequency, duty cycle, burst pattern, amplitude, phase, and ON and OFF states of the signal generation of the oscillator. The oscillator circuit 852 comprises a voltage-controlled oscillator 853 (VCO), the frequency signal of which can be modulated via a burst generator 854. The amplitude of the modulated signal can additionally be adapted via a controllable preamplifier 855 and also a downstream amplifier output stage 856. The final amplified signal is stepped up by a transformer to the required operating voltage of the ultrasonic transducers 840 and is fed to one of the 16 piezoelectric ultrasonic transducers 840 on the cuvettes 201 on the cuvette block 820 via the respective optical switch 857 in S1 to S16 selected by the decoder circuit 851.

The diagram in FIG. 19a shows a first example of a process according to the invention for controlling the temperature of a sample/reagent mixture in a cuvette which is arranged in a temperature-controllable cuvette block (see FIG. 17a).

The temperature curve α shows the heating of the sample/reagent mixture only by the cuvette block controlled to the temperature $T_{BL}$, wherein the target temperature at which the sample/reagent mixture can be measured is not reached until the time $t_2$. If ultrasonic boosts are introduced in the time periods M and A to C, the required target temperature is reached much earlier, at the time $t_1$, as shown in the temperature curve β. The temperature of the cuvette block is controlled using a substantially constant electric power $P_{BL}$.

1) Preheating the cuvette block, with empty cuvettes located therein, to a block temperature $T_{BL}$ (typically 37.0 to 37.5° C.) and stabilizing the block temperature to within 0.1° C.
2) Filling an empty cuvette with a sample/reagent mixture of temperature $T_0$. After being pipetted into the cuvette, the sample/reagent mixture typically has a temperature of 10-15° C., because the pipetted reagents come from a storage area that is cooled to 5° C. and heat up to 10-15° C. in the pipettor and in the supply lines.
3) Emitting an ultrasonic signal for a predefined cumulative duration M, which, in the case of an ultrasonic signal having the average electric power $P_p$, introduces a quantity of energy $M \times P_p$ into the sample/reagent mixture and brings about a calculated change in temperature $\Delta T_M$, this being calculated from variable properties of the sample/reagent mixture which are known from the data of the analysis to be carried out, such as heat capacity, viscosity, thermal conductivity, and also the volume thereof, and constant data stored in the device. The quantity of energy introduced in the duration M is enough to mix the sample/reagent mixture sufficiently.

A mixing duration of 1 to 3 seconds is typically sufficient for homogeneous mixing, wherein the change in temperature $\Delta T_M$ of a 2-second mixing pulse for example may be approximately 3° C.

Alternatively, for a given ultrasonic power $P_p$, the mixing duration M that is necessary in order to obtain a stable measurement signal or incubation process can be determined by experiments on different sample/reagent mixtures and can be stored in the device.

As another alternative method, an optical signal of an analyte measurement can be continuously measured from the sample/reagent mixture and the mixing process can be terminated as soon as a stable signal is obtained, wherein the change in temperature $\Delta T_M$ in this case is calculated—as mentioned—from known thermal characteristics.

4) Observing a pause >1 s (in order to cool the bottom of the cuvette and the site of adhesion to the ultrasonic transducer)

5) Emitting one or more ultrasonic signals, optionally interrupted by pauses >1 s, at a calculated temperature $T_A$ for a predefined cumulative duration A+B+C+n, which corresponds to an additional calculated change in temperature $\Delta T_A + \Delta T_B + \Delta T_C + \Delta T_n$, wherein, after the last ultrasonic pulse has been emitted, a temperature $T_{BL-y}$ is reached which is below the temperature $T_{BL-x}$. From this temperature onward, the input of heat into the cuvette contents takes place purely via heat conduction between the cuvette block 820 and the cuvette contents.

6) Reaching a temperature $T_{BL-x}$ which is acceptable for the analysis and which is lower than the temperature of the cuvette block by the value x, where x is typically at a specified value of 0.1-0.5° C. The acceptable temperature is fixed and is between 36.5 and 37.5° C. The temperature constancy throughout the duration of a subsequent optical measurement should be around 0.1° C.

The diagram in FIG. 19b shows a second example of a process according to the invention for controlling the temperature of a sample/reagent mixture in a cuvette which is arranged in a temperature-controllable cuvette block (see FIG. 17a).

1) (as example 1) Preheating the cuvette block, with empty cuvettes located therein, to a block temperature $T_{BL}$ (typically 37.0 to 37.5° C.) and stabilizing the block temperature to within 0.1° K.

2) (as example 1) Filling an empty cuvette with a sample/reagent mixture of temperature $T_0$. After being pipetted into the cuvette, the sample/reagent mixture typically has a temperature of 10-15° C., because the pipetted reagents come from a storage area that is cooled to 5° C.

3) (as example 1) Emitting an ultrasonic signal for a predefined cumulative duration M, which, in the case of an ultrasonic signal having the average electric power $P_p$, introduces a quantity of energy $M \times P_p$ into the sample/reagent mixture and brings about a calculated change in temperature $\Delta T_M$, this being calculated from variable properties of the sample/reagent mixture which are known from the data of the analysis to be carried out, such as heat capacity, viscosity, thermal conductivity, and also the volume thereof, and constant data stored in the device.

Depending on the stirring task, the suitable cumulative duration of required stirring processes is typically from 1 to 3 seconds, wherein the change in temperature $\Delta T_M$ of a 2-second mixing pulse for example may be around 3° K.

Alternatively, for a given ultrasonic power $P_p$, the mixing duration M that is necessary in order to obtain a stable measurement signal or a washing or incubation process can be determined by experiments on different sample/reagent mixtures and can be stored in the device.

As another alternative method, an optical signal can be continuously measured from the sample/reagent mixture and the mixing process can be terminated as soon as a stable signal is obtained, wherein the change in temperature $\Delta T_M$ in this case is calculated—as mentioned—from known thermal characteristics.

4) (as example 1) Observing a pause >1 s (in order to cool the bottom of the cuvette and the site of adhesion to the ultrasonic transducer)

5) Emitting one or more ultrasonic signals, optionally interrupted by pauses >1 s, at a calculated temperature $0.5 \times (T_{BL} - T_0)$ for a predefined cumulative duration A+B+n, which corresponds to an additional calculated change in temperature $\Delta T_A + \Delta T_B + \Delta T_n$, wherein, after the last ultrasonic pulse has been emitted, a temperature $T_{BL-y}$ is reached which is below the acceptable temperature $T_{BL-x}$ and which can reliably be calculated. From this temperature onward, the input of heat into the cuvette contents takes place purely via heat conduction between the cuvette block and the cuvette contents.

6) (as example 1) Reaching a temperature $T_{BL-x}$ which is acceptable for the analysis and which is lower than the temperature of the cuvette block by the value x, where x is typically at a specified value of 0.1-0.5° K. The acceptable temperature is fixed and is between 36.5 and 37.5° C. The temperature constancy throughout the duration of a subsequent optical measurement should be around 0.1° K.

The invention claimed is:

1. An automatic analyzer for carrying out chemical, biochemical and/or immunochemical analyses of liquid samples, which are present in a sample store of the analyzer, with the aid of liquid reagents, which are present in at least one reagent store of the analyzer, the automatic analyzer comprising:

a sample store housing liquid samples;

at least one reagent store housing liquid reagents;

a plurality of cuvettes configured and arranged for receiving the liquid samples and liquid reagents, each cuvette having a lateral inlet window and at least one lateral outlet window, wherein the plurality of cuvettes is arranged as at least one stationary, linear cuvette array in the analyzer, a pipettor configured and arranged to be movable in an x-direction along a line of movement defined by the linear cuvette array, said pipettor including at least one pipetting module configured and arranged to be movable in a y-direction, the y-direction being substantially normal to the x-direction, and at least one hollow needle of said pipetting module configured and arranged to be lowerable in a z-direction into the plurality of cuvettes and also into individual vessels of the sample store and/or the at least one reagent store, an optical measurement unit including
a stationary light-supplying unit including at least one light distributor device configured and arranged to feed the light from a plurality of LED light sources emitting in the UV/VIS/NIR wavelength range in a spectrally different manner to each other into the lateral inlet windows of the individual cuvettes, and a stationary detection unit assigned to the lateral outlet windows and which has a plurality of photodiodes, a cuvette washing unit configured and arranged to be movable in the x-direction, for cleaning the cuvettes, a needle washing unit configured and arranged for cleaning the at least one hollow needle, a stationary temperature control unit configured and arranged for setting a predefinable measurement temperature in the cuvettes, and wherein each of the at least one light distributor devices has:

a cavity, and first and second inner surfaces of the cavity are at least partially mirrored and/or diffusely reflective, for each LED light source assigned to each respective light distributor device, an inlet opening configured and arranged for feeding the light into the cavity, and for each cuvette of the cuvette array assigned to each respective light distributor device, an outlet opening configured and arranged for feeding the light from the cavity into the cuvette, wherein at least one of the plurality of photodiodes is fixedly assigned to each cuvette.

2. The analyzer according to claim 1, wherein the first inner surface of the light distributor device is located opposite the outlet openings to the cuvettes, and the first inner surface is diffusely reflective.

3. The analyzer according to claim 1, wherein the second inner surface of the light distributor device is located opposite the inlet openings of the LED light sources, and the second inner surface is corrugated and reflective.

4. The analyzer according to any one of claim 1, wherein at least some of the plurality of LED light sources have optical filters configured and arranged to improve the spectral characteristic by comprising at least one narrowband interference filter, and further including at least one optical element configured and arranged for collimating the light in the light path on an input side of the at least one narrowband interference filter.

5. The analyzer according to claim 4, wherein at least one LED light source of the plurality of LED light sources has an LED arranged in a TIR lens and is configured and arranged to collimate the emitted light.

6. The analyzer according to claim 4, further including a tubular body configured and arranged for eliminating non-parallel beam components, the tubular body is arranged in the light path on the input side of at least one optical filter of the optical filters, wherein the tubular body includes through-openings parallel to the longitudinal axis of the tubular body, walls of said through-openings consisting of a light-absorbing material or being coated with such a material.

7. The analyzer according to claim 4, further including a converging lens arranged on the input side of the at least one narrowband interference filter, the converging lens is configured and arranged to align in parallel the light emitted by one of the plurality of LED light sources.

8. The analyzer according to claim 7, wherein the optical measurement unit further includes a diverging lens arranged on the output side of the interference filter, the diverging lens configured and arranged to fan out the radiation entering the at least one light distributor device.

9. The analyzer according to any one of claim 1, further including feedthrough channels arranged in a wall of a cuvette receptacle on the entry side of the inlet window and on the exit side of the outlet window, said feedthrough channels having fittings or modifications configured and arranged to eliminate undesired radiation components of the inlet radiation exiting from the light distributor device and of the measurement radiation exiting from the cuvette.

10. The analyzer according to claim 9, wherein the fittings or modifications of the feedthrough channels in the cuvette receptacle of each cuvette are designed (1) as a channel having a smooth surface with a diameter smaller than the length, or (2) as a feedthrough having a cavity or a clearance or (3) as a feedthrough having a fluted or toothed structure.

11. The analyzer according to claim 9, wherein walls of the feedthrough channels consist of a light-absorbing material or are coated with a light-absorbing material.

12. The analyzer according to any one of claim 1, further including reference detectors arranged on the light distributor device on an outlet side of through-openings or pinhole diaphragms arranged in a wall of the light distributor device.

13. The analyzer according to claim 1, wherein the stationary cuvette array is segmented, and the analyzer further including a separate light distributor device fixedly assigned to each segment of the stationary cuvette array.

14. The analyzer according to claim 1, wherein the photodiodes are arranged as a photodiode array on a common circuit board.

15. The analyzer according to claim 1, further including a second pipettor which is configured and arranged to be movable independently of the pipettor in the x-direction.

16. The analyzer according to claim 1, wherein the pipettor has two pipetting modules configured and arranged to be movable independently of one another and parallel to one another in the y-direction.

17. The analyzer according to claim 1, wherein the pipettor includes a base structure configured and arranged to be movable in the x-direction, and to which two beams are attached, said two beams being oriented parallel to one another and projecting horizontally in the y-direction, and pipetting modules which are each independently configured and arranged to move past one another, and are arranged on the mutually facing longitudinal sides of said beams, each pipetting module having at least one hollow needle configured and arranged to be lowerable into the individual vessels and cuvettes.

18. The analyzer according to claim 17, wherein the two beams are connected at an end remote from the base structure so as to form a frame structure.

19. The analyzer according to claim 17, wherein each of the at least one hollow needle of the two pipetting modules is configured and arranged to be moved past each of the at least one hollow needle of the other pipetting module, and maintain a minimum spacing from one another in the x-direction of 2 to 16 mm when the two pipetting modules move past one another.

20. The analyzer according to claim 1, wherein the needle washing unit is arranged on the pipettor and is configured and arranged to be movable with the pipettor.

21. The analyzer according to claim 1, wherein the cuvette washing unit is configured and arranged as a movable machine component which in each washing position has access to one cuvette or to a group of cuvettes simultaneously arranged next to one another.

22. The analyzer according to claim 1, wherein the temperature control unit includes heating foils in thermal contact with individual cuvettes or groups of cuvettes, and the temperature control unit is configured and arranged to apply different temperature levels to each of the cuvettes.

23. The analyzer according to claim 1, wherein the temperature control unit includes a cuvette block configured and arranged to be regulated to a predefined target temperature, said cuvette block having a temperature control means and is positioned in thermal contact with the individual cuvettes.

24. The analyzer according to claim 1, further including
a mixer unit configured and arranged for mixing the samples and the reagents in the cuvettes, the mixer unit including stationary mixer units configured and arranged to be assigned to the cuvettes,
at least one ultrasonic transducer configured and arranged for introducing ultrasonic energy into the cuvettes being attached to each of the plurality of cuvettes, wherein the ultrasonic transducer is designed as a piezoelectric thickness-mode transducer and is connected to a control unit configured and arranged to actuate the at least one ultrasonic transducer as a function of parameter values of the liquid media.

25. The analyzer according to claim 23, further including
a mixer unit configured and arranged for mixing the samples and the reagents in the cuvettes, the mixer unit including stationary mixer units configured and arranged to be assigned to the cuvettes,
at least one ultrasonic transducer configured and arranged for introducing ultrasonic energy into the cuvettes, and the at least one ultrasonic transducer is a piezoelectric thickness-mode transducer and is connected to a control unit configured and arranged to actuate the at least one ultrasonic transducer as a function of parameter values of the liquid media, and
wherein the mixer unit and the temperature control unit function as a combined mixing and temperature control device.

26. The analyzer according to claim 23, wherein the cuvette block includes
a base part with form-fitting receptacles configured and arranged to receive the cuvettes, and
an openable front part.

* * * * *